US 12,187,612 B2

(12) United States Patent
Edlund

(10) Patent No.: US 12,187,612 B2
(45) Date of Patent: Jan. 7, 2025

(54) HYDROGEN GENERATION ASSEMBLIES

(71) Applicant: Element 1 Corp, Bend, OR (US)

(72) Inventor: David J Edlund, Bend, OR (US)

(73) Assignee: Element 1 Corp, Bend, OR (US)

( * ) Notice: Subject to any disclaimer, the term of this patent is extended or adjusted under 35 U.S.C. 154(b) by 39 days.

(21) Appl. No.: 17/348,400

(22) Filed: Jun. 15, 2021

(65) Prior Publication Data

US 2022/0396480 A1 Dec. 15, 2022

(51) Int. Cl.
*C01B 3/56* (2006.01)
*B01J 19/00* (2006.01)
(Continued)

(52) U.S. Cl.
CPC .............. *C01B 3/56* (2013.01); *B01J 19/0013* (2013.01); *C01B 3/32* (2013.01); *C01B 3/501* (2013.01);
(Continued)

(58) Field of Classification Search
CPC .. C01B 3/56; C01B 3/32; C01B 3/501; C01B 3/52; C01B 2203/0227; C01B 2203/0405; C01B 2203/0415; C01B 2203/042; C01B 2203/0475; C01B 2203/0822; B01J 19/0013; B01J 2219/00157; C10J 3/82;
(Continued)

(56) References Cited

U.S. PATENT DOCUMENTS

| | | |
|---|---|---|
| 2,151,329 A | 3/1939 | Page et al. |
| 2,196,463 A | 4/1940 | Holleran |

(Continued)

FOREIGN PATENT DOCUMENTS

| | | |
|---|---|---|
| CA | 2467012 A1 | 4/2001 |
| CN | 1384043 A | 12/2002 |

(Continued)

OTHER PUBLICATIONS

Examination Report prepared by the Taiwan Intellectual Property Office (TIPO), Taiwan Patent Application No. 110131460, Apr. 12, 2022, pp. 37 pages.

(Continued)

*Primary Examiner* — Wayne A Langel
*Assistant Examiner* — Syed T Iqbal
(74) *Attorney, Agent, or Firm* — Chernoff, Vilhauer, McClung & Stenzel, LLP

(57) ABSTRACT

Hydrogen generation assemblies and methods are disclosed. In one embodiment, the method includes receiving a feed stream in a fuel processing assembly, and heating, via one or more burners, a hydrogen generating region of the fuel processing assembly to at least a minimum hydrogen-producing temperature. The method additionally includes generating an output stream in the heated hydrogen generating region of the fuel processing assembly from the received feed stream, and generating a product hydrogen stream and a byproduct stream in a purification region of the fuel processing assembly from the output stream. The method further includes separating at least a portion of the carbon dioxide gas from the byproduct stream to generate a fuel stream having a carbon dioxide concentration less than the byproduct stream, and feeding the fuel stream to the one or more burners.

11 Claims, 9 Drawing Sheets

(51) Int. Cl.
  *C01B 3/32*     (2006.01)
  *C01B 3/50*     (2006.01)
  *C01B 3/52*     (2006.01)
  *C10J 3/82*     (2006.01)
  *H01M 8/0612*   (2016.01)

(52) U.S. Cl.
  CPC .............. *C01B 3/52* (2013.01); *C10J 3/82* (2013.01); *H01M 8/0618* (2013.01); *B01J 2219/00157* (2013.01); *C01B 2203/0227* (2013.01); *C01B 2203/0405* (2013.01); *C01B 2203/0415* (2013.01); *C01B 2203/042* (2013.01); *C01B 2203/0475* (2013.01); *C01B 2203/0822* (2013.01); *C10J 2300/1612* (2013.01)

(58) Field of Classification Search
  CPC .......... C10J 2300/1612; H01M 8/0618; C10K 1/005; Y02E 60/50
  See application file for complete search history.

(56) References Cited

U.S. PATENT DOCUMENTS

| | | | |
|---|---|---|---|
| 3,154,920 | A | 11/1964 | Nash et al. |
| 3,415,634 | A | 12/1968 | Dent et al. |
| 3,421,871 | A | 1/1969 | Davies et al. |
| 3,586,621 | A | 6/1971 | Pitchford et al. |
| 3,608,610 | A | 9/1971 | Greatorex et al. |
| 3,642,460 | A | 2/1972 | Thompson |
| 3,737,291 | A | 6/1973 | Lhonore et al. |
| 3,761,382 | A | 9/1973 | Hammond et al. |
| 3,761,386 | A | 9/1973 | Smith |
| 3,825,490 | A | 7/1974 | Vachuda |
| 3,838,994 | A | 10/1974 | Aldridge |
| 3,888,043 | A | 6/1975 | Child et al. |
| 3,935,636 | A | 2/1976 | Mermelstein |
| 3,984,324 | A | 10/1976 | Wang |
| 4,104,201 | A | 8/1978 | Banks et al. |
| 4,124,478 | A | 11/1978 | Tsien et al. |
| 4,319,978 | A | 3/1982 | Millman |
| 4,472,176 | A | 9/1984 | Rubin |
| 4,692,306 | A | 9/1987 | Minet et al. |
| 4,896,636 | A | 1/1990 | Pfefferle |
| 5,053,195 | A | 10/1991 | MacKay |
| 5,112,527 | A | 5/1992 | Kobylinski |
| 5,139,541 | A | 8/1992 | Edlund |
| 5,217,506 | A | 6/1993 | Edlund et al. |
| 5,259,870 | A | 11/1993 | Edlund |
| 5,266,283 | A | 11/1993 | Friesen et al. |
| 5,281,254 | A | 1/1994 | Birbara et al. |
| 5,393,325 | A | 2/1995 | Edlund |
| 5,498,278 | A | 3/1996 | Edlund |
| 5,536,405 | A | 7/1996 | Myma et al. |
| 5,580,476 | A | 12/1996 | Dam et al. |
| 5,636,511 | A | 6/1997 | Pfefferle et al. |
| 5,645,626 | A | 7/1997 | Edlund et al. |
| 2,196,343 | A | 8/1998 | Saltsman |
| 5,791,308 | A | 8/1998 | Carter et al. |
| 5,861,137 | A | 1/1999 | Edlund |
| 5,888,273 | A | 3/1999 | Buxbaum |
| 5,964,089 | A | 10/1999 | Murphy et al. |
| 5,997,594 | A | 12/1999 | Edlund et al. |
| 6,103,028 | A | 8/2000 | Juda et al. |
| 6,136,222 | A | 10/2000 | Friesen et al. |
| 6,152,995 | A | 11/2000 | Edlund |
| 6,221,117 | B1 | 4/2001 | Edlund et al. |
| 6,319,306 | B1 | 11/2001 | Edlund et al. |
| 6,368,742 | B2 | 4/2002 | Fisher et al. |
| 6,375,906 | B1 | 4/2002 | Edlund et al. |
| 6,376,113 | B1 | 4/2002 | Edlund et al. |
| 6,383,670 | B1 | 5/2002 | Edlund et al. |
| 6,402,818 | B1 | 6/2002 | Sengupta |
| 6,419,728 | B1 | 7/2002 | Edlund |
| 6,451,464 | B1 | 9/2002 | Edlund et al. |
| 6,458,189 | B1 | 10/2002 | Edlund et al. |
| 6,465,118 | B1 | 10/2002 | Dickman et al. |
| 6,494,937 | B1 | 12/2002 | Edlund et al. |
| 6,495,277 | B1 | 12/2002 | Edlund et al. |
| 6,537,352 | B2 | 3/2003 | Edlund et al. |
| 6,547,858 | B1 | 4/2003 | Edlund et al. |
| 6,562,111 | B2 | 5/2003 | Edlund et al. |
| 6,564,579 | B1 | 5/2003 | McCartney |
| 6,569,227 | B2 | 5/2003 | Edlund et al. |
| 6,596,057 | B2 | 7/2003 | Edlund et al. |
| 6,616,841 | B2 | 9/2003 | Cho et al. |
| 6,632,270 | B2 | 10/2003 | Edlund et al. |
| 6,667,128 | B2 | 12/2003 | Edlund |
| 6,719,831 | B2 | 4/2004 | Edlund et al. |
| 6,719,832 | B2 | 4/2004 | Edlund et al. |
| 6,723,156 | B2 | 4/2004 | Edlund et al. |
| 6,758,101 | B2 | 7/2004 | Valentine |
| 6,767,389 | B2 | 7/2004 | Edlund et al. |
| 6,783,741 | B2 | 8/2004 | Edlund et al. |
| 6,811,908 | B2 | 11/2004 | Edlund et al. |
| 6,818,335 | B2 | 11/2004 | Edlund et al. |
| 6,824,593 | B2 | 11/2004 | Edlund et al. |
| 6,835,481 | B2 | 12/2004 | Dickman et al. |
| 6,858,341 | B2 | 2/2005 | Edlund |
| 6,869,707 | B2 | 3/2005 | Edlund et al. |
| 6,878,474 | B2 | 4/2005 | Dickman et al. |
| 6,890,672 | B2 | 5/2005 | Dickman et al. |
| 6,953,497 | B2 | 10/2005 | Edlund et al. |
| 6,979,507 | B2 | 12/2005 | Edlund et al. |
| 6,994,927 | B2 | 2/2006 | Edlund et al. |
| 7,005,113 | B2 | 2/2006 | Edlund et al. |
| 7,008,708 | B2 | 3/2006 | Edlund et al. |
| 7,033,641 | B2 | 4/2006 | Saijo et al. |
| 7,052,530 | B2 | 5/2006 | Edlund et al. |
| 7,101,421 | B2 | 9/2006 | Edlund et al. |
| 7,135,048 | B1 | 11/2006 | Edlund et al. |
| 7,147,677 | B2 | 12/2006 | Edlund |
| 7,195,663 | B2 | 3/2007 | Edlund et al. |
| 7,201,783 | B2 | 4/2007 | Edlund |
| 7,208,241 | B2 | 4/2007 | Edlund et al. |
| 7,250,231 | B2 | 7/2007 | Edlund |
| 7,258,946 | B2 | 8/2007 | Edlund |
| 7,297,183 | B2 | 11/2007 | Edlund et al. |
| 7,368,194 | B2 | 5/2008 | Dickman et al. |
| 7,368,195 | B2 | 5/2008 | Edlund et al. |
| 7,390,587 | B2 | 6/2008 | Dickman et al. |
| 7,410,531 | B2 | 8/2008 | Edlund et al. |
| 7,470,293 | B2 | 12/2008 | Edlund et al. |
| 7,476,455 | B2 | 1/2009 | Edlund |
| 7,485,381 | B2 | 2/2009 | Dickman et al. |
| 7,601,302 | B2 | 10/2009 | Edlund et al. |
| 7,632,321 | B2 | 12/2009 | Edlund |
| 7,632,322 | B2 | 12/2009 | Edlund |
| 7,641,795 | B2 | 1/2010 | Taylor et al. |
| 7,659,019 | B2 | 2/2010 | Edlund |
| 7,682,718 | B2 | 3/2010 | Dickman et al. |
| 7,736,596 | B2 | 6/2010 | Edlund et al. |
| 7,771,882 | B2 | 8/2010 | Edlund et al. |
| 7,789,941 | B2 | 9/2010 | Edlund et al. |
| 7,819,955 | B2 | 10/2010 | Edlund et al. |
| 7,828,864 | B2 | 11/2010 | Edlund et al. |
| 7,846,569 | B2 | 12/2010 | Edlund et al. |
| 7,939,211 | B2 | 5/2011 | Edlund et al. |
| 7,977,000 | B2 | 7/2011 | Edlund |
| 7,981,172 | B2 | 7/2011 | Edlund et al. |
| 7,985,510 | B2 | 7/2011 | Edlund et al. |
| 8,021,446 | B2 | 9/2011 | Adams et al. |
| 8,038,748 | B2 | 10/2011 | Edlund |
| 8,057,575 | B2 | 11/2011 | Edlund et al. |
| 8,133,626 | B2 | 3/2012 | Edlund et al. |
| 8,226,751 | B2 | 7/2012 | Shibe et al. |
| 8,262,752 | B2 | 9/2012 | Popham |
| 8,603,219 | B2 | 12/2013 | Edlund et al. |
| 8,956,428 | B2 | 2/2015 | Carnell et al. |
| 8,961,627 | B2 | 2/2015 | Edlund |
| 9,187,324 | B2 | 11/2015 | Edlund |
| 9,458,013 | B1* | 10/2016 | Sicinski .............. C01B 3/38 |
| 9,616,389 | B2 | 4/2017 | Edlund |
| 9,656,215 | B2 | 5/2017 | Edlund |

(56) References Cited

U.S. PATENT DOCUMENTS

| | | |
|---|---|---|
| 9,777,237 B2 | 10/2017 | Edlund |
| 9,914,641 B2 | 5/2018 | Edlund et al. |
| 10,166,506 B2 | 1/2019 | Edlund |
| 10,273,423 B2 | 4/2019 | Edlund et al. |
| 10,391,458 B2 | 8/2019 | Edlund |
| 10,702,827 B2 | 7/2020 | Edlund |
| 2001/0045061 A1 | 11/2001 | Edlund et al. |
| 2002/0041837 A1 | 4/2002 | Edlund et al. |
| 2002/0071976 A1 | 6/2002 | Edlund |
| 2002/0081235 A1 | 6/2002 | Baldwin et al. |
| 2002/0083829 A1* | 7/2002 | Edlund ............... B01D 53/22 95/55 |
| 2002/0100518 A1 | 8/2002 | Kuriiwa et al. |
| 2002/0114984 A1 | 8/2002 | Edlund et al. |
| 2003/0015096 A1 | 1/2003 | Sato et al. |
| 2003/0033933 A1 | 2/2003 | Frost et al. |
| 2003/0087138 A1 | 5/2003 | Margiott et al. |
| 2003/0091876 A1 | 5/2003 | Rusta-Sellehy et al. |
| 2003/0167690 A1 | 9/2003 | Edlund et al. |
| 2003/0192251 A1 | 10/2003 | Edlund et al. |
| 2003/0223926 A1 | 12/2003 | Edlund et al. |
| 2003/0223931 A1 | 12/2003 | Narayan |
| 2003/0228442 A1 | 12/2003 | Prince et al. |
| 2004/0003720 A1 | 1/2004 | Beisswenger et al. |
| 2004/0005720 A1 | 1/2004 | Cremer et al. |
| 2004/0065013 A1 | 4/2004 | DeVries |
| 2004/0066043 A1 | 4/2004 | Maiwald et al. |
| 2004/0081867 A1 | 4/2004 | Edlund |
| 2004/0081868 A1 | 4/2004 | Edlund |
| 2004/0099138 A1 | 5/2004 | Karode et al. |
| 2004/0197616 A1 | 10/2004 | Edlund et al. |
| 2004/0200459 A1 | 10/2004 | Bennett et al. |
| 2004/0229090 A1 | 11/2004 | Davis et al. |
| 2005/0000802 A1 | 1/2005 | Hobbs |
| 2005/0074648 A1 | 4/2005 | Arthur |
| 2005/0129995 A1 | 6/2005 | Kato |
| 2005/0132640 A1 | 6/2005 | Kelly et al. |
| 2005/0154198 A1 | 7/2005 | Trotta et al. |
| 2005/0188616 A1 | 9/2005 | Bizjak et al. |
| 2005/0211480 A1 | 9/2005 | Kejha |
| 2006/0037244 A1 | 2/2006 | Clawson |
| 2006/0037476 A1 | 2/2006 | Edlund et al. |
| 2006/0081524 A1 | 4/2006 | Sengupta et al. |
| 2006/0090397 A1 | 5/2006 | Edlund et al. |
| 2006/0112636 A1 | 6/2006 | Chellappa et al. |
| 2006/0127719 A1 | 6/2006 | Brantley et al. |
| 2006/0144788 A1 | 7/2006 | Cath et al. |
| 2006/0216562 A1 | 9/2006 | Edlund et al. |
| 2006/0272212 A1 | 12/2006 | Edlund |
| 2007/0062116 A1 | 3/2007 | Edlund et al. |
| 2007/0074904 A1 | 4/2007 | Kohora et al. |
| 2007/0172402 A1 | 7/2007 | Palo et al. |
| 2007/0183968 A1 | 8/2007 | Healey et al. |
| 2007/0190380 A1 | 8/2007 | DeVries |
| 2007/0243127 A1* | 10/2007 | Fedorov ............... B01J 12/007 422/198 |
| 2007/0274904 A1 | 11/2007 | Popham et al. |
| 2007/0292729 A1 | 12/2007 | Brantley et al. |
| 2008/0031809 A1 | 2/2008 | Norbeck et al. |
| 2008/0041454 A1 | 2/2008 | Eijkelenberg et al. |
| 2008/0115669 A1 | 5/2008 | Edlund et al. |
| 2008/0138677 A1 | 6/2008 | Edlund |
| 2008/0176118 A1 | 7/2008 | Edlund et al. |
| 2008/0187797 A1 | 8/2008 | Edlund |
| 2008/0210088 A1 | 9/2008 | Pledger |
| 2008/0213638 A1 | 9/2008 | Brantley et al. |
| 2008/0222954 A1 | 9/2008 | Adams et al. |
| 2009/0011310 A1 | 1/2009 | Trabold et al. |
| 2010/0028223 A1 | 2/2010 | Popham et al. |
| 2010/0050520 A1 | 3/2010 | Arnold et al. |
| 2010/0055518 A1 | 3/2010 | Chen et al. |
| 2010/0064887 A1 | 3/2010 | Edlund et al. |
| 2010/0068132 A1 | 3/2010 | Vencill et al. |
| 2010/0181765 A1 | 7/2010 | More et al. |
| 2010/0230079 A1 | 9/2010 | Byers et al. |
| 2010/0261074 A1 | 10/2010 | Edlund et al. |
| 2011/0014528 A1 | 1/2011 | Kani et al. |
| 2011/0111314 A1* | 5/2011 | Cui .................. H01M 8/04022 429/417 |
| 2011/0212375 A1 | 9/2011 | Taguchi et al. |
| 2011/0250518 A1 | 10/2011 | Edlund et al. |
| 2011/0256459 A1 | 10/2011 | Edlund |
| 2011/0256491 A1 | 10/2011 | Edlund et al. |
| 2012/0058403 A1 | 3/2012 | Edlund et al. |
| 2012/0208903 A1 | 8/2012 | Gafney |
| 2013/0011301 A1 | 1/2013 | Edlund |
| 2013/0090505 A1 | 4/2013 | Catchpole |
| 2013/0255487 A1 | 10/2013 | Edlund et al. |
| 2014/0065020 A1 | 3/2014 | Edlund et al. |
| 2014/0065021 A1 | 3/2014 | Edlund |
| 2014/0326447 A1 | 11/2014 | Fermaniuk |
| 2015/0122128 A1 | 5/2015 | Edlund |
| 2015/0275112 A1* | 10/2015 | Boissonnet ............ C10K 1/006 518/703 |
| 2016/0083251 A1* | 3/2016 | Edlund ................. C01B 3/501 423/648.1 |
| 2016/0130515 A1 | 3/2016 | Edlund |
| 2016/0131424 A1* | 5/2016 | Edlund ..................... C10L 3/08 62/625 |
| 2016/0340185 A1 | 11/2016 | Xiang |
| 2017/0043300 A1 | 2/2017 | Stoltenberg et al. |
| 2017/0209828 A1 | 7/2017 | Edlund |
| 2017/0216805 A1 | 8/2017 | Edlund |
| 2018/0126330 A1 | 5/2018 | Edlund et al. |
| 2018/0264398 A1 | 9/2018 | Edlund et al. |
| 2019/0118132 A1 | 4/2019 | Edlund |
| 2019/0135626 A1 | 5/2019 | Rafati et al. |
| 2019/0336920 A1 | 11/2019 | Edlund |
| 2020/0289977 A1 | 9/2020 | Edlund |
| 2020/0289978 A1 | 9/2020 | Edlund |
| 2020/0316517 A1 | 10/2020 | Edlund |
| 2021/0162335 A1 | 6/2021 | Edlund |

FOREIGN PATENT DOCUMENTS

| | | |
|---|---|---|
| CN | 1524308 A | 8/2004 |
| CN | 1931708 A | 3/2007 |
| CN | 101214921 A | 7/2008 |
| CN | 201161926 Y | 12/2008 |
| CN | 101350411 A | 1/2009 |
| CN | 101542805 A | 9/2009 |
| CN | 101837955 A | 9/2010 |
| CN | 101956634 A | 1/2011 |
| CN | 105163832 A | 12/2015 |
| CN | 105271118 A | 1/2016 |
| CN | 107697885 A | 2/2018 |
| CN | 107265403 A | 3/2020 |
| CN | 111542383 A | 8/2020 |
| DE | 69120740 | 11/1996 |
| DE | 69219084 | 7/1997 |
| DE | 69730071 | 8/2005 |
| DE | 60035418 | 3/2008 |
| DE | 60035418 T2 | 3/2008 |
| EP | 0036268 | 9/1981 |
| EP | 0570185 | 11/1993 |
| EP | 0652042 | 5/1995 |
| EP | 0718031 | 6/1996 |
| EP | 0470822 | 7/1996 |
| EP | 0546808 | 4/1997 |
| EP | 0783919 | 7/1997 |
| EP | 0957063 A1 | 11/1999 |
| EP | 1010942 | 2/2003 |
| EP | 0800852 | 8/2004 |
| EP | 1272259 | 10/2004 |
| EP | 1516663 | 3/2005 |
| EP | 1135822 | 4/2005 |
| EP | 1279431 B1 | 4/2005 |
| EP | 1523054 | 4/2005 |
| EP | 1557395 A2 | 7/2005 |
| EP | 1679111 | 7/2006 |
| EP | 0951529 | 8/2006 |
| EP | 1252678 | 11/2006 |
| EP | 1189678 | 7/2007 |

(56) References Cited

FOREIGN PATENT DOCUMENTS

| | | |
|---|---|---|
| EP | 1290747 | 2/2009 |
| EP | 1138096 | 10/2010 |
| EP | 2359928 | 8/2011 |
| EP | 2631213 | 8/2013 |
| EP | 2969132 A1 | 1/2016 |
| GB | 2355418 A | 4/2001 |
| GB | 2370241 A | 6/2002 |
| GB | 2432369 | 4/2010 |
| JP | 6321204 A | 1/1988 |
| JP | 6339622 A | 2/1988 |
| JP | 63126539 A | 5/1988 |
| JP | 63252903 A | 10/1988 |
| JP | 6463019 A | 3/1989 |
| JP | 6127903 A | 5/1994 |
| JP | H06290800 A | 10/1994 |
| JP | 10052621 | 2/1998 |
| JP | 11265833 A | 9/1999 |
| JP | 2001010804 A | 1/2001 |
| JP | 3360766 B2 | 12/2002 |
| JP | 2002346372 A | 12/2002 |
| JP | 2003081603 A | 3/2003 |
| JP | 2003511336 A | 3/2003 |
| JP | 2003277019 | 10/2003 |
| JP | 2003282119 | 10/2003 |
| JP | 2003530664 A | 10/2003 |
| JP | 2003334418 A | 11/2003 |
| JP | 2004071242 A | 3/2004 |
| JP | 2004525488 A | 8/2004 |
| JP | 2005067990 A | 3/2005 |
| JP | 2005154198 A | 6/2005 |
| JP | 2005296746 A | 10/2005 |
| JP | 2006019033 A | 1/2006 |
| JP | 2006040597 A | 2/2006 |
| JP | 2006503780 A | 2/2006 |
| JP | 2006137668 A | 6/2006 |
| JP | 2006523795 A | 10/2006 |
| JP | 2007095548 A | 4/2007 |
| JP | 2007099528 | 4/2007 |
| JP | 2008518871 A | 6/2008 |
| JP | 2008171815 | 7/2008 |
| JP | 2008528430 A | 7/2008 |
| JP | 2008536796 A | 9/2008 |
| JP | 2008253984 A | 10/2008 |
| JP | 2008-285404 | 11/2008 |
| JP | 2008308351 A | 12/2008 |
| JP | 2009173534 A | 8/2009 |
| JP | 2010010050 A | 1/2010 |
| JP | 2010013323 A | 1/2010 |
| JP | 2010111543 A | 5/2010 |
| JP | 2011057480 A | 3/2011 |
| JP | 2002293504 A | 10/2012 |
| JP | 2014517804 A | 7/2014 |
| JP | 2014520750 A | 8/2014 |
| JP | 2016516655 A | 6/2016 |
| JP | 6538764 B2 | 6/2019 |
| JP | 6975286 B2 | 12/2021 |
| TW | 563270 B1 | 11/2003 |
| TW | 200404739 | 4/2004 |
| TW | 200629635 | 8/2006 |
| TW | 200740014 A | 10/2007 |
| TW | 200804177 A | 1/2008 |
| TW | 201429868 A | 8/2014 |
| TW | 201733903 A | 10/2017 |
| TW | 201815663 A | 5/2018 |
| TW | 700246 B | 8/2020 |
| WO | 8806489 | 9/1988 |
| WO | 9919456 | 4/1999 |
| WO | 0022690 | 4/2000 |
| WO | 0056425 | 9/2000 |
| WO | 0108247 | 2/2001 |
| WO | 0112311 | 2/2001 |
| WO | 0112539 | 2/2001 |
| WO | 0126174 | 4/2001 |
| WO | 0150541 | 7/2001 |
| WO | 0150542 | 7/2001 |
| WO | 0168514 | 9/2001 |
| WO | 0170376 | 9/2001 |
| WO | 0173879 | 10/2001 |
| WO | 0193362 | 12/2001 |
| WO | 0238265 | 5/2002 |
| WO | 0249128 | 6/2002 |
| WO | 02069428 | 9/2002 |
| WO | 03002244 | 1/2003 |
| WO | 03026776 | 4/2003 |
| WO | 03041188 A2 | 5/2003 |
| WO | 03077331 | 9/2003 |
| WO | 03086964 | 10/2003 |
| WO | 03089128 | 10/2003 |
| WO | 03100900 | 12/2003 |
| WO | 2004038845 | 5/2004 |
| WO | 2004091005 | 10/2004 |
| WO | 2005001955 | 1/2005 |
| WO | 2005091785 | 10/2005 |
| WO | 2005119824 | 12/2005 |
| WO | 2006011619 A1 | 2/2006 |
| WO | 2006033773 | 3/2006 |
| WO | 2006049918 | 5/2006 |
| WO | 2006050335 | 5/2006 |
| WO | 2006081402 A2 | 8/2006 |
| WO | 2006133003 | 12/2006 |
| WO | 2007035467 | 3/2007 |
| WO | 2007037856 | 4/2007 |
| WO | 2007049130 A1 | 5/2007 |
| WO | 2008008279 | 1/2008 |
| WO | 2008008279 A2 | 1/2008 |
| WO | 2008033301 | 3/2008 |
| WO | 2008033301 A1 | 3/2008 |
| WO | 2009088962 | 7/2009 |
| WO | 2010033628 | 3/2010 |
| WO | 2010118221 | 10/2010 |
| WO | 2011059446 | 5/2011 |
| WO | 2012067612 | 5/2012 |
| WO | 2012067612 A1 | 5/2012 |
| WO | 2013158343 | 10/2013 |
| WO | 2014099606 | 6/2014 |
| WO | 2014158749 A1 | 10/2014 |
| WO | 2015183426 | 12/2015 |
| WO | 2015183426 A1 | 12/2015 |
| WO | 2019136156 A1 | 7/2019 |

OTHER PUBLICATIONS

Rejection Report prepared by the Taiwan Intellectual Property Office (TIPO), Taiwan Patent Application No. 110131460, Sep. 13, 2022, 9 pages.
Notice of Preliminary Rejection prepared by the Korean Intellectual Property Office, Korean Patent Application No. 10-2022-7033348, Nov. 7, 2022, 11 pages.
Notice of Preliminary Rejection prepared by the Korean Intellectual Property Office, Korean Patent Application No. 10-2020-7022167, Jan. 19, 2022, 16 pages.
Decision of Rejection, prepared by the China National Intellectual Property Administration (CNIPA), Chinese Patent Application No. 201980007152.5, Mar. 25, 2022, 22 pages.
Office Action prepared by the US Patent and Trademark Office for U.S. Appl. No. 17/167,555, dated Jun. 10, 2022, 68 pages.
Final Office Action prepared by the US Patent and Trademark Office for U.S. Appl. No. 17/167,555, dated, Oct. 31, 2022, 10 pages.
Office Action prepared by the US Patent and Trademark Office for U.S. Appl. No. 17/348,400 dated Dec. 13, 2022, 8 pages.
International Search Report and Written Opinion prepared by the US Patent and Trademark Office for PCT/US2022/32503, dated Oct. 25, 2022, 17 pages.
Office Action prepared by the Japanese Patent Office for JP2022-3522, dated Dec. 23, 2022, 11 pages.
Office Action prepared by the Canadian Intellectual Property Office for CA No. 2,967,340, Apr. 25, 2018, 5 pages.
Office Action prepared by the US Patent and Trademark Office for U.S. Appl. No. 15/717,591, filed Jul. 9, 2018, 12 pages.
Office Action prepared by the Canadian Intellectual Property Office for CA 2,967,340, Sep. 11, 2019, 4 pages.

(56) References Cited

OTHER PUBLICATIONS

Final Office Action prepared by the US Patent and Trademark Office for U.S. Appl. No. 16/287,482, filed Dec. 2, 2019, 31 pages.
David Edlund, "Methanol Fuel Cell Systems: Advancing Towards Commercialization", 2011, 199 pages, Pan Stanford Publishing Pte. Ltd, Singapore.
World Intellectual Property Organization, Certified Copy of U.S. Appl. No. 62/003,532, filed May 27, 2014, 24 pages, available at: https://patentscope.wipo.int/search/en/detail.jsf?docId=WO2015183426&recNum=1&tab=PCTDocuments&maxRec=&office=&prevFilter=&sortOption=&queryString=.
Korean Intellectual Property Office, International Search Report, International Application No. PCT/US2015/026510, Sep. 18, 2015, 3 pages.
Korean Intellectual Property Office, Written Opinion, International Application No. PCT/US2015/026510, Sep. 18, 2015, 6 pages.
International Searching Authority of the United States Receiving Office, International Search Report, Jan. 28, 2016, 2 pages.
International Searching Authority of the United States Receiving Office, Writtten Opinion, Jan. 28, 2016, 20 pages.
United States Patent and Trademark Office, Office Action for U.S. Appl. No. 14/820,256, filed Oct. 13, 2016, 35 pages.
The International Bureau of WIPO, International Preliminary Report on Patentability for International Application No. PCT/US2015/060175, May 26, 2017, 16 pages.
International Search Report and the Written Opinion of the International Searching Authority, PCT Application No. PCT/2022/32503, Oct. 25, 2022, pp. 1-17.
US Receiving Office Written Opinion for PCT Application No. PCT/US12/45437, Nov. 19, 2012, 6 pages.
US Receiving Office, International Search Report for PCT Application No. PCT/US13/56908, dated Jan. 24, 2014, 2 pages.
US Receiving Office, Written Opinion for PCT Application No. PCT/US13/56908, dated Jan. 24, 2014, 13 pages.
US Receiving Office, International Search report for PCT Application No. PCT/US2014/019837, dated Jun. 6, 2014, 2 pages.
US Receiving Office, Written Opinion for PCT Application No. PCT/US2014/019837, dated Jun. 6, 2014, 8 pages.
US Receiving Office, International Preliminary Report for PCT Application No. PCT/US2012/045437, dated Jan. 7, 2014, 7 pages.
Taiwan Intellectual Property Office, Examination Report in Taiwanese Patent Application No. 101124209, dated Dec. 19, 2013, 32 pages.
US Receiving Office, Written Opinion for International Application No. PCT/US12/45437, dated Nov. 19, 2012, 7 pages.
HGS-M Series Hydrogen Generator: Powering Fuel Cells from readily available Methanol, www.hy9.com, Hopkinton, Massachusetts, USA, updated Jun. 20, 2011, 2 pages.
Office Action prepared by the Chinese Patent Office for CN201710102421, dated Sep. 16, 2019, 26 pages.
Election/Restriction Requirement prepared by the US Patent and Trademark Office for U.S. Appl. No. 15/862,474, filed Sep. 30, 2019, 6 pages.
Office Action prepared by the US Patent and Trademark Office for U.S. Appl. No. 15/985,175, filed Oct. 10, 2019, 57 pages.
Office Action prepared by the Taiwan Patent Office for TW 107145920, dated Nov. 5, 2019, 21 pages.
Taiwan Intellectual Property Office, Examination Report for Taiwanese Patent Application No. 102131014, dated Dec. 27, 2014, 29 pages.
European Patent Office, Extended Search Report for European Patent Application No. 13832056.9, dated Mar. 18, 2016, 6 pages.
U.S. Patent and Trademark Office, Office Action for U.S. Appl. No. 13/600,096, filed Feb. 5, 2015, 56 pages.
Japan Patent Office, Office Action for Japanese Patent Application No. 2014519267, dated Apr. 6, 2015, 13 pages.
Taiwan Intellectual Property Office, Office Action for Taiwanese Patent Application No. 103134184, dated Apr. 30, 2015, 17 pages.
U.S. Patent and Trademark Office, Office Action for U.S. Appl. No. 13/600,096, filed Jun. 1, 2015, 9 pages.
U.S. Patent and Trademark Office, Office Action for U.S. Appl. No. 13/829,766, filed Jun. 26, 2015, 6 pages.
Office Action prepared by the US Patent and Trademark Office for U.S. Appl. No. 15/985,175, filed Oct. 10, 2019, 69 pages.
Japan Patent Office, Office Action for Japanese Patent Application No. 2015529963, dated Jan. 18, 2016, 7 pages.
State Intellectual Property Office of the P.R.C., Office Action for Chinese Patent Application No. 201280039436.0, dated Jan. 27, 2015, 28 pages.
State Intellectual Property Office of the P.R.C., Office Action for Chinese Patent Application No. 2016062901774250, dated Jul. 4, 2016, 31 pages.
State Intellectual Property Office of the P.R.C., Office Action for Chinese Patent Application No. 201380052485.2, dated Jan. 12, 2016, 29 pages.
U.S. Patent and Trademark Office, Office Action for U.S. Appl. No. 13/600,096, filed Sep. 11, 2015, 9 pages.
Office Action prepared by the State Intellectual Property Office of PR China for Cn 201710352484.X, dated Dec. 11, 2018, 14 pages.
Notice of Reasons for Rejection prepared by the Japanese Patent Office for JP 2017182239, dated Nov. 12, 2018, 4 pages.
Decision to Reject the Amendments prepared by the Japanese Patent Office for JP 2017130918, dated Dec. 3, 2018, 5 pages.
Decision of Rejection prepared by the Japanese Patent Office for JP 2017130918, dated Dec. 3, 2018, 3 pages.
Office Action prepared by the European Patent Office for EP 14 773 171.51104, dated Jul. 20, 2018, 5 pages.
Office Action prepared by the European Patent Office for EP 13 832 056.91101, dated Aug. 21, 2018, 4 pages.
Office Action prepared by the Japanese Patent Office for JP 2017130918, dated Jul. 30, 2018, 7 pages.
International Search Report and Written Opinion prepared by the US Patent and Trademark Office for PCT/US2019/012192, dated Mar. 8, 2019, 8 pages.
Office Action prepared by the European Patent Office for EP 13 832 056.9, dated Mar. 20, 2019, 5 pages.
Office Action prepared by the US Patent and Trademark Office for U.S. Appl. No. 15/486,755, filed Mar. 18, 2019, 77 pages.
Office Action prepared by the US Patent and Trademark Office for U.S. Appl. No. 16/287,482, filed Jun. 12, 2019, 10 pages.
Office Action prepared by the European Patent Office for EP 14773171.5, dated Jun. 28, 2019, 4 pages.
Office Action prepared by the Chinese Patent Office for CN 201710352484X, dated Jul. 18, 2019, 3 pages.
Hearing Notice for IN 433/KOLNP/2015, Jul. 30, 2019, 2 pages.
Taiwan Intellectual Property Office, Decision of Rejection for Taiwanese Patent Application No. 102131014, dated Nov. 2, 2015, 15 pages.
Taiwan Intellectual Property Office, Examination Report for Taiwanese Patent Application No. 103108640, dated Nov. 23, 2015, 39 pages.
Office Action prepared by the Taiwan Intellectual Property Office (TIPO), Taiwan Patent Application No. 111120271, Jul. 11, 2023, 43 pages.
Decision of Rejection prepared by the Taiwan Intellectual Property Office (TIPO), Taiwan Patent Application No. 111120271, dated Nov. 24, 2023, 11 pages.

* cited by examiner

HYDROGEN GENERATION ASSEMBLIES

BACKGROUND OF THE DISCLOSURE

A hydrogen generation assembly is an assembly that converts one or more feedstocks into a product stream containing hydrogen gas as a majority component. The feedstocks may include a carbon-containing feedstock and, in some embodiments, also may include water. The feedstocks are delivered to a hydrogen-producing region of the hydrogen generation assembly from a feedstock delivery system, typically with the feedstocks being delivered under pressure and at elevated temperatures. The hydrogen-producing region is often associated with a temperature modulating assembly, such as a heating assembly or cooling assembly, which consumes one or more fuel streams to maintain the hydrogen-producing region within a suitable temperature range for effectively producing hydrogen gas. The hydrogen generation assembly may generate hydrogen gas via any suitable mechanism(s), such as steam reforming, autothermal reforming, pyrolysis, and/or catalytic partial oxidation.

The generated or produced hydrogen gas may, however, have impurities. That gas may be referred to as a mixed gas stream that contains hydrogen gas and other gases. Prior to using the mixed gas stream, it must be purified, such as to remove at least a portion of the other gases. The hydrogen generation assembly may therefore include a hydrogen purification device for increasing the hydrogen purity of the mixed gas stream. The hydrogen purification device may include at least one hydrogen-selective membrane to separate the mixed gas stream into a product stream and a byproduct stream. The product stream contains a greater concentration of hydrogen gas and/or a reduced concentration of one or more of the other gases from the mixed gas stream. Hydrogen purification using one or more hydrogen-selective membranes is a pressure driven separation process in which the one or more hydrogen-selective membranes are contained in a pressure vessel. The mixed gas stream contacts the mixed gas surface of the membrane(s), and the product stream is formed from at least a portion of the mixed gas stream that permeates through the membrane(s). The pressure vessel is typically sealed to prevent gases from entering or leaving the pressure vessel except through defined inlet and outlet ports or conduits.

The product stream may be used in a variety of applications. One such application is energy production, such as in electrochemical fuel cells. An electrochemical fuel cell is a device that converts fuel and an oxidant to electricity, a reaction product, and heat. For example, fuel cells may convert hydrogen and oxygen into water and electricity. In those fuel cells, the hydrogen is the fuel, the oxygen is the oxidant, and the water is a reaction product. Fuel cell stacks include a plurality of fuel cells and may be utilized with a hydrogen generation assembly to provide an energy production assembly.

Examples of hydrogen generation assemblies, hydrogen processing assemblies, and/or components of those assemblies are described in U.S. Pat. Nos. 5,861,137; 6,319,306; 6,494,937; 6,562,111; 7,063,047; 7,306,868; 7,470,293; 7,601,302; 7,632,322; 8,961,627; 9,187,324; 9,914,641; 10,717,040; and U.S. Patent Application Publication Nos. 2006/0090397; 2006/0272212; 2007/0266631; 2007/0274904; 2008/0085434; 2008/0138678; 2008/0230039; and 2010/0064887. The complete disclosures of the above patents and patent application publications are hereby incorporated by reference for all purposes.

SUMMARY OF THE DISCLOSURE

Some embodiments include methods of generating hydrogen. In one embodiment, the method includes receiving a feed stream in a fuel processing assembly. The feed stream containing a carbon-containing feedstock. The method additionally includes heating, via one or more burners, a hydrogen generating region of the fuel processing assembly to at least a minimum hydrogen-producing temperature. The method further includes generating an output stream in the heated hydrogen generating region of the fuel processing assembly from the received feed stream. The output stream containing hydrogen gas and carbon dioxide gas.

The method additionally includes generating a product hydrogen stream and a byproduct stream in a purification region of the fuel processing assembly from the output stream. The product hydrogen stream having a hydrogen concentration greater than the output stream and a carbon dioxide concentration less than the output stream, and the byproduct stream having a hydrogen concentration less than the output stream and a carbon dioxide concentration greater than the output stream. The method further includes separating at least a portion of the carbon dioxide gas from the byproduct stream to generate a fuel stream having a carbon dioxide concentration less than the byproduct stream. The method additionally includes feeding the fuel stream to the one or more burners.

Some embodiments include hydrogen generation assemblies. In one embodiment, the assembly includes an enclosure and a hydrogen-producing region contained within the enclosure. The hydrogen-producing region configured to produce an output stream from at least one feed stream. The output stream containing hydrogen gas and carbon dioxide gas, the at least one feed stream containing a carbon-containing feedstock. The assembly additionally includes a heating assembly configured to receive at least one air stream and at least one fuel stream and to combust the at least one fuel stream within a combustion region contained within the enclosure producing a heated exhaust stream for heating the hydrogen-producing region to at least a minimum hydrogen-producing temperature.

The assembly further includes a purification region contained within the enclosure. The purification region is configured to produce a product hydrogen stream and a byproduct stream, the product hydrogen stream having a hydrogen concentration greater than the output stream and a carbon dioxide concentration less than the output stream, the byproduct stream having a hydrogen concentration less than the output stream and a carbon dioxide concentration greater than the output stream. The assembly additionally includes a gas removal assembly configured to separate at least a portion of carbon dioxide gas from the byproduct stream and to produce at least a portion of the at least one fuel stream therefrom.

DETAILED DESCRIPTION OF THE DISCLOSURE

Figure 1:
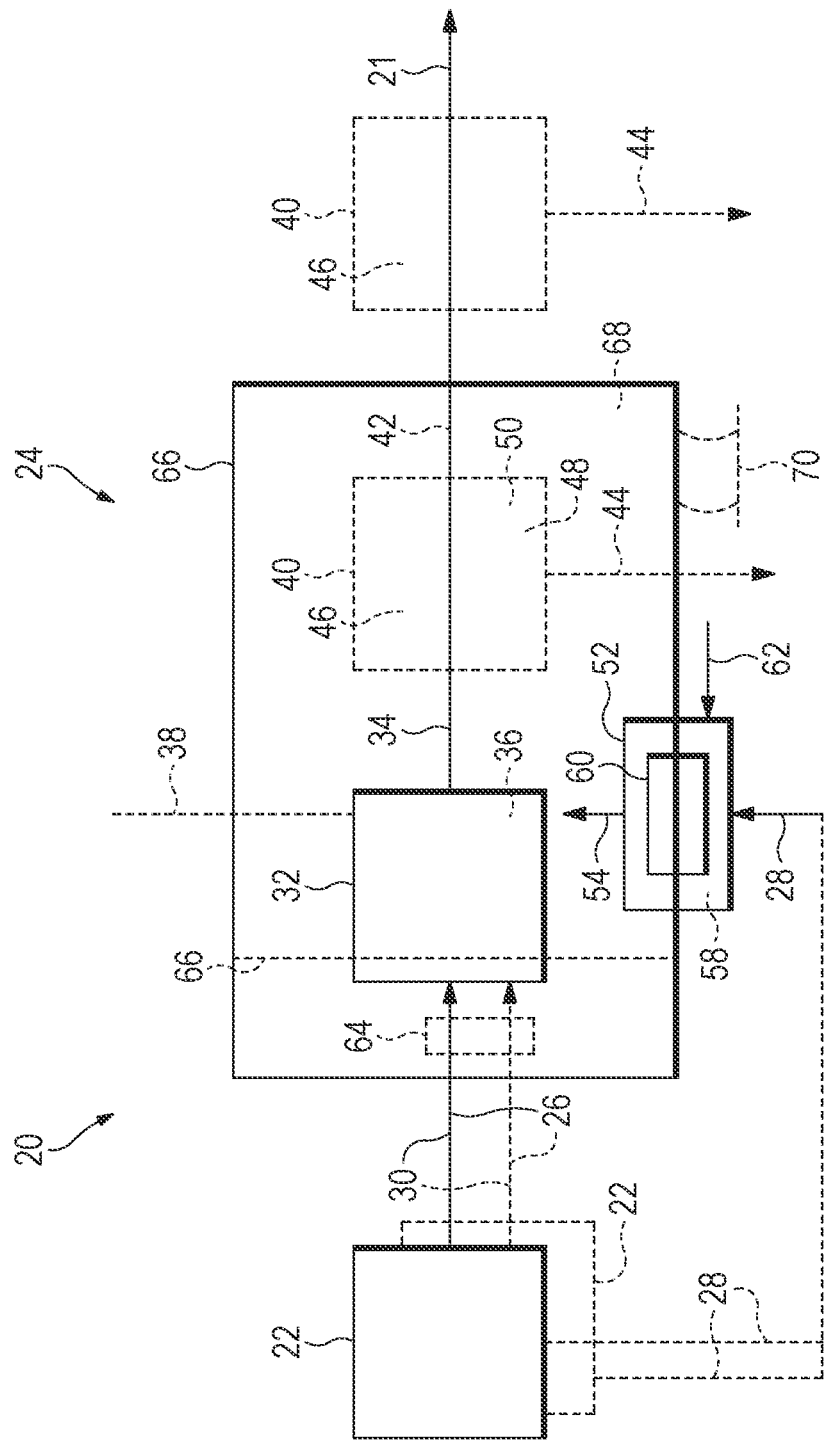
FIG. 1 is a schematic view of an example of a hydrogen generation assembly.

FIG. 1 shows an example of a hydrogen generation assembly 20. Unless specifically excluded hydrogen generation assembly 20 may include one or more components of other hydrogen generation assemblies described in this disclosure. The hydrogen generation assembly may include any suitable structure configured to generate a product hydrogen stream 21. For example, the hydrogen generation assembly may include a feedstock delivery system 22 and a fuel processing assembly 24. The feedstock delivery system may include any suitable structure configured to selectively deliver at least one feed stream 26 to the fuel processing assembly.

In some embodiments, feedstock delivery system 22 may additionally include any suitable structure configured to selectively deliver at least one fuel stream 28 to a burner or other heating assembly of fuel processing assembly 24. In some embodiments, feed stream 26 and fuel stream 28 may be the same stream delivered to different parts of the fuel processing assembly. The feedstock delivery system may include any suitable delivery mechanisms, such as a positive displacement or other suitable pump or mechanism for propelling fluid streams. In some embodiments, feedstock delivery system may be configured to deliver feed stream(s) 26 and/or fuel stream(s) 28 without requiring the use of pumps and/or other electrically powered fluid-delivery mechanisms. Examples of suitable feedstock delivery systems that may be used with hydrogen generation assembly 20 include the feedstock delivery systems described in U.S. Pat. Nos. 7,470,293 and 7,601,302, and U.S. Patent Application Publication No. 2006/0090397. The complete disclosures of the above patents and patent application are hereby incorporated by reference for all purposes.

Feed stream 26 may include at least one hydrogen-production fluid 30, which may include one or more fluids that may be utilized as reactants to produce product hydrogen stream 21. For example, the hydrogen-production fluid may include a carbon-containing feedstock, such as at least one hydrocarbon and/or alcohol. Examples of suitable hydrocarbons include methane, propane, natural gas, diesel, kerosene, gasoline, etc. Examples of suitable alcohols include methanol, ethanol, polyols (such as ethylene glycol and propylene glycol), etc. Additionally, hydrogen-production fluid 30 may include water, such as when the fuel processing assembly generates the product hydrogen stream via steam reforming and/or autothermal reforming. When fuel processing assembly 24 generates the product hydrogen stream via pyrolysis or catalytic partial oxidation, feed stream 26 does not contain water.

In some embodiments, feedstock delivery system 22 may be configured to deliver a hydrogen-production fluid 30 that contains a mixture of water and a carbon-containing feedstock that is miscible with water (such as methanol and/or another water-soluble alcohol). The ratio of water to carbon-containing feedstock in such a fluid stream may vary according to one or more factors, such as the particular carbon-containing feedstock being used, user preferences, design of the fuel processing assembly, mechanism(s) used by the fuel processing assembly to generate the product hydrogen stream etc. For example, the molar ratio of water to carbon may be approximately 1:1 to 3:1. Additionally, mixtures of water and methanol may be delivered at or near a 1:1 molar ratio (37 weight % water, 63 weight % methanol), while mixtures of hydrocarbons or other alcohols may be delivered at a water-to-carbon molar ratio greater than 1:1.

When fuel processing assembly 24 generates product hydrogen stream 21 via reforming, feed stream 26 may include, for example, approximately 25-75 volume % methanol or ethanol (or another suitable water-miscible carbon-containing feedstock) and approximately 25-75 volume % water. For feed streams that at least substantially include methanol and water, those streams may include approximately 50-75 volume % methanol and approximately 25-50 volume % water. Streams containing ethanol or other water-miscible alcohols may contain approximately 25-60 volume % alcohol and approximately 40-75 volume % water. An example of a feed stream for hydrogen generating assembly 20 that utilizes steam reforming or autothermal reforming contains 69 volume % methanol and 31 volume % water.

Although feedstock delivery system 22 is shown to be configured to deliver a single feed stream 26, the feedstock delivery system may be configured to deliver two or more feed streams 26. Those streams may contain the same or different feedstocks and may have different compositions, at least one common component, no common components, or the same compositions. For example, a first feed stream may include a first component, such as a carbon-containing feedstock and a second feed stream may include a second component, such as water. Additionally, although feedstock delivery system 22 may, in some embodiments, be configured to deliver a single fuel stream 28, the feedstock delivery system may be configured to deliver two or more fuel streams. The fuel streams may have different compositions, at least one common component, no common components, or the same compositions. Moreover, the feed and fuel streams may be discharged from the feedstock delivery system in different phases. For example, one of the streams may be a liquid stream while the other is a gas stream. In some embodiments, both streams may be liquid streams, while in other embodiments both streams may be gas streams. Furthermore, although hydrogen generation assembly 20 is shown to include a single feedstock delivery system 22, the hydrogen generation assembly may include two or more feedstock delivery systems 22.

Fuel processing assembly 24 may include a hydrogen-producing region 32 configured to produce an output stream 34 containing hydrogen gas via any suitable hydrogen-producing mechanism(s). The output stream may include hydrogen gas as at least a majority component and may include additional gaseous component(s). Output stream 34 may therefore be referred to as a "mixed gas stream" that contains hydrogen gas as its majority component but which includes other gases.

Hydrogen-producing region 32 may include any suitable catalyst-containing bed or region. When the hydrogen-producing mechanism is steam reforming, the hydrogen-producing region may include a suitable steam reforming catalyst 36 to facilitate production of output stream(s) 34 from feed stream(s) 26 containing a carbon-containing feedstock and water. In such an embodiment, fuel processing assembly 24 may be referred to as a "steam reformer," hydrogen-producing region 32 may be referred to as a "reforming region," and output stream 34 may be referred to as a "reformate stream." The other gases that may be present in the reformate stream may include carbon monoxide, carbon dioxide, methane, steam, and/or unreacted carbon-containing feedstock.

When the hydrogen-producing mechanism is autothermal reforming, hydrogen-producing region 32 may include a suitable autothermal reforming catalyst to facilitate the production of output stream(s) 34 from feed stream(s) 26 containing water and a carbon-containing feedstock in the presence of air. Additionally, fuel processing assembly 24 may include an air delivery assembly 38 configured to deliver air stream(s) to the hydrogen-producing region.

In some embodiments, fuel processing assembly 24 may include a purification (or separation) region 40, which may include any suitable structure configured to produce at least one hydrogen-rich stream 42 from output (or mixed gas) stream 34. Hydrogen-rich stream 42 may include a greater hydrogen concentration than output stream 34 and/or a reduced concentration of one or more other gases (or impurities) that were present in that output stream. Product hydrogen stream 21 includes at least a portion of hydrogen-rich stream 42. Thus, product hydrogen stream 21 and hydrogen-rich stream 42 may be the same stream and have the same composition and flow rates. Alternatively, some of the purified hydrogen gas in hydrogen-rich stream 42 may be stored for later use, such as in a suitable hydrogen storage assembly and/or consumed by the fuel processing assembly. Purification region 40 also may be referred to as a "hydrogen purification device" or a "hydrogen processing assembly."

In some embodiments, purification region 40 may produce at least one byproduct stream 44, which may contain no hydrogen gas or some hydrogen gas. The byproduct stream may be exhausted, sent to a burner assembly and/or other combustion source, used as a heated fluid stream, stored for later use, and/or otherwise utilized, stored, and/or disposed. Additionally, purification region 40 may emit the byproduct stream as a continuous stream responsive to the deliver of output stream 34, or may emit that stream intermittently, such as in a batch process or when the byproduct portion of the output stream is retained at least temporarily in the purification region.

Fuel processing assembly 24 may include one or more purification regions configured to produce one or more byproduct streams containing sufficient amounts of hydrogen gas to be suitable for use as a fuel stream (or a feedstock stream) for a heating assembly for the fuel processing assembly. In some embodiments, the byproduct stream may have sufficient fuel value or hydrogen content to enable a heating assembly to maintain the hydrogen-producing region at a desired operating temperature or within a selected range of temperatures. For example, the byproduct stream may include hydrogen gas, such as 10-30 volume % hydrogen gas, 15-25 volume % hydrogen gas, 20-30 volume % hydrogen gas, at least 10 or 15 volume % hydrogen gas, at least 20 volume % hydrogen gas, etc.

Purification region 40 may include any suitable structure configured to enrich (and/or increase) the concentration of at least one component of output stream 21. In most applications, hydrogen-rich stream 42 will have a greater hydrogen concentration than output stream (or mixed gas stream) 34. The hydrogen-rich stream also may have a reduced concentration of one or more non-hydrogen components that were present in output stream 34 with the hydrogen concentration of the hydrogen-rich stream being more, the same, or less than the output stream. For example, in conventional fuel cell systems, carbon monoxide may damage a fuel cell stack if it is present in even a few parts per million, while other non-hydrogen components that may be present in output stream 34, such as water, will not damage the stack even if present in much greater concentrations. Therefore, in such an application, the purification region may not increase the overall hydrogen concentration but will reduce the concentration of one or more non-hydrogen components that are harmful, or potentially harmful, to the desired application for the product hydrogen stream.

Examples of suitable devices for purification region 40 include one or more hydrogen-selective membranes 46, chemical carbon monoxide removal assemblies 48, and/or pressure swing adsorption (PSA) systems 50. Purification region 40 may include more than one type of purification device and the devices may have the same or different structures and/or operate by the same or different mechanism(s). Fuel processing assembly 24 may include at least one restrictive orifice and/or other flow restrictor downstream of the purification region(s), such as associated with one or more product hydrogen stream(s), hydrogen-rich stream(s), and/or byproduct stream(s).

Hydrogen-selective membranes 46 are permeable to hydrogen gas, but are at least substantially (if not completely) impermeable to other components of output stream 34. Membranes 46 may be formed of any hydrogen-permeable material suitable for use in the operating environment and parameters in which purification region 40 is operated. Examples of suitable materials for membranes 46 include palladium and palladium alloys, and especially thin films of such metals and metal alloys. Palladium alloys have proven particularly effective, especially palladium with 35 weight % to 45 weight % copper. A palladium-copper alloy that contains approximately 40 weight % copper has proven particularly effective, although other relative concentrations and components may be used. Three other especially effective alloys are palladium with 2 weight % to 20 weight % gold, especially palladium with 5 weight % gold; palladium with 3 weight % to 10 weight % indium plus 0 weight % to 10 weight % ruthenium, especially palladium with 6 weight % indium plus 0.5 weight % ruthenium; and palladium with 20 weight % to 30 weight % silver. When palladium and palladium alloys are used, hydrogen-selective membranes 46 may sometimes be referred to as "foils." Typical thickness of hydrogen-permeable metal foils is less than 25 microns (micrometers), preferably less than or equal to 15 microns, and most preferably between 5 and 12 microns. The foils may be any suitable dimensions, such as 110 mm by 270 mm.

Chemical carbon monoxide removal assemblies 48 are devices that chemically react carbon monoxide and/or other undesirable components of output stream 34 to form other compositions that are not as potentially harmful. Examples of chemical carbon monoxide removal assemblies include water-gas shift reactors that are configured to produce hydrogen gas and carbon dioxide from water and carbon monoxide, partial oxidation reactors that are configured to convert carbon monoxide and oxygen (usually from air) into carbon dioxide, and methanation reactors that are configured to convert carbon monoxide and hydrogen to methane and water. Fuel processing assembly 24 may include more than one type and/or number of chemical removal assemblies 48.

Pressure swing adsorption (PSA) is a chemical process in which gaseous impurities are removed from output stream 34 based on the principle that certain gases, under the proper conditions of temperature and pressure, will be adsorbed onto an adsorbent material more strongly than other gases. Typically, the non-hydrogen impurities are adsorbed and removed from output stream 34. Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites. PSA system 50 also provides an example of a device for use in purification region 40 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 40 is shown within fuel processing assembly 24. The purification region may alternatively be separately located downstream from the fuel processing assembly, as is schematically illustrated in dashed lines in FIG. 1. Purification region 40 also may include portions within and external to the fuel processing assembly.

Fuel processing assembly 24 also may include a temperature modulating assembly in the form of a heating assembly 52. The heating assembly may be configured to produce at least one heated exhaust stream (or combustion stream) 54 from at least one heating fuel stream 28, typically as combusted in the presence of air. Heated exhaust stream 54 is schematically illustrated in FIG. 1 as heating hydrogen-producing region 32. Heating assembly 52 may include any suitable structure configured to generate the heated exhaust stream, such as a burner or combustion catalyst in which a fuel is combusted with air to produce the heated exhaust stream. The heating assembly may include an ignitor or ignition source 58 that is configured to initiate the combustion of fuel. Examples of suitable ignition sources include one or more spark plugs, glow plugs, combustion catalyst, pilot lights, piezoelectric ignitors, spark igniters, hot surface igniters, etc.

In some embodiments, heating assembly 52 may include a burner assembly 60 and may be referred to as a combustion-based, or combustion-driven, heating assembly. In a combustion-based heating assembly, heating assembly 52 may be configured to receive at least one fuel stream 28 and to combust the fuel stream in the presence of air to provide a hot combustion stream 54 that may be used to heat at least the hydrogen-producing region of the fuel processing assembly. Air may be delivered to the heating assembly via a variety of mechanisms. For example, an air stream 62 may be delivered to the heating assembly as a separate stream, as shown in FIG. 1. Alternatively, or additionally, air stream 62 may be delivered to the heating assembly with at least one of the fuel streams 28 for heating assembly 52 and/or drawn from the environment within which the heating assembly is utilized.

Combustion stream 54 may additionally, or alternatively, be used to heat other portions of the fuel processing assembly and/or fuel cell systems with which the heating assembly is used. Additionally, other configuration and types of heating assemblies 52 may be used. For example, heating assembly 52 may be an electrically powered heating assembly that is configured to heat at least hydrogen-producing region 32 of fuel processing assembly 24 by generating heat using at least one heating element, such as a resistive heating element. In those embodiments, heating assembly 52 may not receive and combust a combustible fuel stream to heat the hydrogen-producing region to a suitable hydrogen-producing temperature. Examples of heating assemblies are disclosed in U.S. Pat. No. 7,632,322, the complete disclosure of which is hereby incorporated by reference for all purposes.

Heating assembly 52 may be housed in a common shell or housing with the hydrogen-producing region and/or separation region (as further discussed below). The heating assembly may be separately positioned relative to hydrogen-producing region 32 but in thermal and/or fluid communication with that region to provide the desired heating of at least the hydrogen-producing region. Heating assembly 52 may be located partially or completely within the common shell, and/or at least a portion (or all) of the heating assembly may be located external that shell. When the heating assembly is located external the shell, the hot combustion gases from burner assembly 60 may be delivered via suitable heat transfer conduits to one or more components within the shell.

The heating assembly also may be configured to heat feedstock delivery system 22, the feedstock supply streams, hydrogen-producing region 32, purification (or separation) region 40, or any suitable combination of those systems, streams, and regions. Heating of the feedstock supply streams may include vaporizing liquid reactant streams or components of the hydrogen-production fluid used to produce hydrogen gas in the hydrogen-producing region. In that embodiment, fuel processing assembly 24 may be described as including a vaporization region 64. The heating assembly may additionally be configured to heat other components of the hydrogen generation assembly. For example, the heated exhaust stream may be configured to heat a pressure vessel and/or other canister containing the heating fuel and/or the hydrogen-production fluid that forms at least portions of feed stream 26 and fuel stream 28.

Heating assembly 52 may achieve and/or maintain in hydrogen-producing region 32 any suitable temperatures. Steam reformers typically operate at temperatures in the range of 200° C. and 900° C. However, temperatures outside this range are within the scope of this disclosure. When the carbon-containing feedstock is methanol, the steam reforming reaction will typically operate in a temperature range of approximately 200-500° C. Example subsets of that range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Example subsets of that range include 750-850° C., 725-825° C., 650-750° C., 700-800° C., 700-900° C., 500-800° C., 400-600° C., and 600-800° C. Hydrogen-producing region 32 may include two or more zones, or portions, each of which may be operated at the same or at different temperatures. For example, when the hydrogen-production fluid includes a hydrocarbon, hydrogen-producing region 32 may include two different hydrogen-producing portions, or regions, with one operating at a lower temperature than the other to provide a pre-reforming region. In those embodiments, the fuel processing assembly may also be referred to as including two or more hydrogen-producing regions.

Fuel stream 28 may include any combustible liquid(s) and/or gas(es) that are suitable for being consumed by heating assembly 52 to provide the desired heat output. Some fuel streams may be gases when delivered and combusted by heating assembly 52, while others may be delivered to the heating assembly as a liquid stream. Examples of suitable heating fuels for fuel streams 28 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. Yet other examples include hydrogen and carbon monoxide. In embodiments of hydrogen generation assembly 20 that include a temperature modulating assembly in the form of a cooling assembly instead of a heating assembly (such as may be used when an exothermic hydrogen-generating process—e.g., partial oxidation—is utilized instead of an endothermic process such as steam reforming), the feedstock delivery system may be configured to supply a fuel or coolant stream to the assembly. Any suitable fuel or coolant fluid may be used.

Fuel processing assembly 24 may additionally include a shell or housing 66 in which at least hydrogen-producing region 32 is contained, as shown in FIG. 1. In some embodiments, vaporization region 64 and/or purification region 40 may additionally be contained within the shell. Shell 66 may enable components of the steam reformer or other fuel processing mechanism to be moved as a unit. The shell also may protect components of the fuel processing assembly from damage by providing a protective enclosure and/or may reduce the heating demand of the fuel processing assembly because components may be heated as a unit. Shell 66 may include insulating material 68, such as a solid insulating material, blanket insulating material, and/or an air-filled cavity. The insulating material may be internal the shell, external the shell, or both. When the insulating material is external a shell, fuel processing assembly 24 may further include an outer cover or jacket 70 external the insulation, as schematically illustrated in FIG. 1. The fuel processing assembly may include a different shell that includes additional components of the fuel processing assembly, such as feedstock delivery system 22 and/or other components.

One or more components of fuel processing assembly 24 may either extend beyond the shell or be located external the shell. For example, purification region 40 may be located external shell 66, such as being spaced-away from the shell but in fluid communication by suitable fluid-transfer conduits. As another example, a portion of hydrogen-producing region 32 (such as portions of one or more reforming catalyst beds) may extend beyond the shell, such as indicated schematically with a dashed line representing an alternative shell configuration in FIG. 1. Examples of suitable hydrogen generation assemblies and its components are disclosed in U.S. Pat. Nos. 5,861,137; 5,997,594; and 6,221,117, the complete disclosures of which are hereby incorporated by reference for all purposes.

Figure 2:
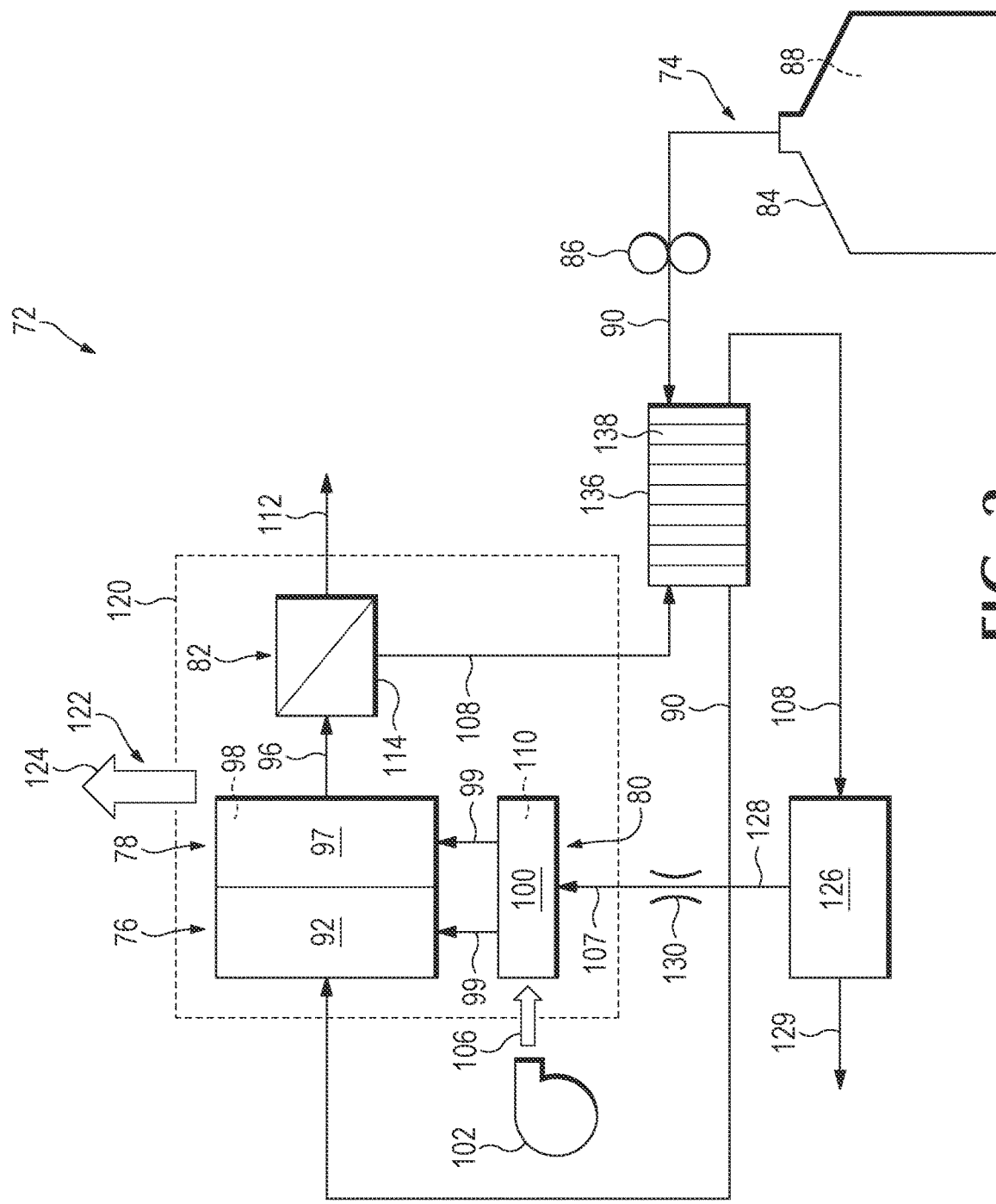
FIG. 2 is a schematic view of an example of the hydrogen generation assembly of FIG. 1.

Another example of hydrogen generation assembly 20 is shown in FIG. 2, and is generally indicated at 72. Unless specifically excluded, hydrogen generation assembly 72 may include one or more components of hydrogen generation assembly 20. Hydrogen-generation assembly 72 may include a feedstock delivery system 74, a vaporization region 76, a hydrogen-producing region 78, a heating assembly 80, and a purification region 82, as shown in FIG. 2.

The feedstock delivery system may include any suitable structure configured to deliver one or more feed and/or fuel streams to one or more other components of the hydrogen-generation assembly. For example, feedstock delivery system may include a feedstock tank (or container) 84 and a pump 86. The feedstock tank may contain any suitable hydrogen-production fluid 88, such as water and/or a carbon-containing feedstock (e.g., a methanol/water mixture). Pump 86 may have any suitable structure configured to deliver the hydrogen-production fluid, which may be in the form of at least one liquid-containing feed stream 90 that includes water and a carbon-containing feedstock, to vaporization region 76 and/or hydrogen-producing region 78. In some embodiments, the feedstock delivery system may be configured to deliver feed stream(s) 90 without requiring the use of pumps and/or other electrically powered fluid-delivery mechanisms.

Vaporization region 76 may include any suitable structure configured to receive and vaporize at least a portion of a liquid-containing feed stream, such as liquid-containing feed stream 90. For example, vaporization region 76 may include a vaporizer 92 configured to at least partially transform liquid-containing feed stream 90 into one or more vapor feed streams. The vapor feed streams may, in some embodiments, include liquid. An example of a suitable vaporizer is a coiled tube vaporizer, such as a coiled stainless steel tube.

Hydrogen-producing region 78 may include any suitable structure configured to receive one or more feed streams, such as the vapor feed stream(s) from the vaporization region, to produce one or more output streams 96 containing hydrogen gas as a majority component and other gases, such as carbon dioxide. The hydrogen-producing region may produce the output stream via any suitable mechanism(s). For example, hydrogen-producing region 78 may generate output stream(s) 96 via a steam reforming reaction, an autothermal reforming reaction, or a partial oxidation reaction. When output stream(s) 96 are generated via a steam reforming reaction, hydrogen-producing region 78 may include a steam reforming region 97 with a reforming catalyst 98 configured to facilitate and/or promote the steam reforming reaction. When hydrogen-producing region 78 generates output stream(s) 96 via a steam reforming reaction, hydrogen generation assembly 72 may be referred to as a "steam reforming hydrogen generation assembly" and output stream 96 may be referred to as a "reformate stream."

Heating assembly 80 may include any suitable structure configured to produce at least one heated exhaust stream 99 for heating one or more other components of the hydrogen generation assembly 72. For example, the heating assembly may heat the vaporization region to any suitable temperature(s), such as at least a minimum vaporization temperature or the temperature in which at least a portion of the liquid-containing feed stream is vaporized to form the vapor feed stream. Additionally, or alternatively, heating assembly 80 may heat the hydrogen-producing region to any suitable temperature(s), such as at least a minimum hydrogen-producing temperature or the temperature in which at least a portion of the vapor feed stream is reacted to produce hydrogen gas to form the output stream. The heating assembly may be in thermal communication with one or more components of the hydrogen generation assembly, such as the vaporization region and/or hydrogen-producing region.

The heating assembly may include a burner assembly 100 and at least one air blower 102, as shown in FIG. 2. The burner assembly may include any suitable structure configured to receive at least one air stream 106 and at least one fuel stream 107 and to combust the at least one fuel stream within a combustion region 110 to produce heated exhaust stream 99. The fuel stream may be provided by feedstock delivery system 74 and/or purification region 82, as further discussed below. The combustion region may be contained within an enclosure of the hydrogen generation assembly. Air blower 102 may include any suitable structure configured to generate air stream(s) 106. In some embodiments, the heating assembly may include an igniter assembly (not shown) configured to ignite fuel stream(s) 107.

Purification region 82 may include any suitable structure configured to produce at least one hydrogen-rich stream or product hydrogen stream 112, which may include a greater hydrogen concentration than output stream 96 and/or a reduced concentration of one or more other gases or impurities, such as carbon dioxide, that were present in that output stream. The purification region may produce at least one byproduct stream 108, which includes a lesser hydrogen concentration than output stream 96 and/or an increased concentration of the one or more other gases or impurities. Purification region 82 may include a membrane assembly 114. In some embodiments, purification region 82 also may include a methanation reactor assembly, such as downstream of the membrane assembly, to convert carbon monoxide and hydrogen to methane and water.

Membrane assembly 114 may include any suitable structure configured to receive output or mixed gas stream(s) 96 that contains hydrogen gas and other gases, and to generate permeate or hydrogen-rich stream(s) 112 containing a greater concentration of hydrogen gas and/or a lower concentration of other gases than the mixed gas stream. Membrane assembly 114 may incorporate hydrogen-permeable (or hydrogen-selective) membranes that are planar or tubular, and more than one hydrogen-permeable membrane may be incorporated into membrane assembly 114. The permeate stream(s) may be used for any suitable applications, such as for one or more fuel cells. In some embodiments, the membrane assembly may generate at least one byproduct stream 108 that includes at least a substantial portion of the other gases, such as carbon dioxide gas. Although purification region 82 is shown to include membrane assembly 114, the purification region may alternatively, or additionally, include one or more other components configured to purify output stream 96 and/or generate one or more product hydrogen streams and/or one or more byproduct streams.

In some embodiments, hydrogen generation assembly 72 may include a shell or housing 120 which may at least partially contain one or more other components of that assembly. For example, shell 120 may at least partially contain vaporization region 76, hydrogen-producing region 78, heating assembly 80, and/or purification region 82, as shown in FIG. 2. Shell 120 may include one or more exhaust ports 122 configured to discharge at least one combustion exhaust stream 124 produced by heating assembly 80.

In some embodiments, hydrogen generation assembly 72 may include a gas removal assembly 126 configured to separate at least a portion of carbon dioxide gas from byproduct stream 108 to produce a fuel stream 128 having a concentration of carbon dioxide gas less than the byproduct stream and an offgas stream 129 having a concentration of carbon dioxide gas more than the byproduct stream. The offgas stream may be compressed and/or liquified, stored as compressed gas, discharged to pipeline, chemically converted to other compounds, etc. Fuel stream 128 may form all or part of fuel stream 107 that is used or burned by burner assembly 100. A flow restricting orifice 130 may restrict flow of fuel stream 128 to burner assembly 100. Gas removal assembly 126 may include any suitable components as further discussed below.

In some embodiments, hydrogen generation assembly 72 may include a heat exchange assembly 136, which may include one or more heat exchangers 138 configured to transfer heat from one portion of the hydrogen generation assembly to another portion. For example, heat exchange assembly 136 may transfer heat from byproduct stream 108 to feed stream 90 to raise the temperature of the feed stream prior to entering vaporization region 76, as well as to cool byproduct stream 108.

Figure 3:
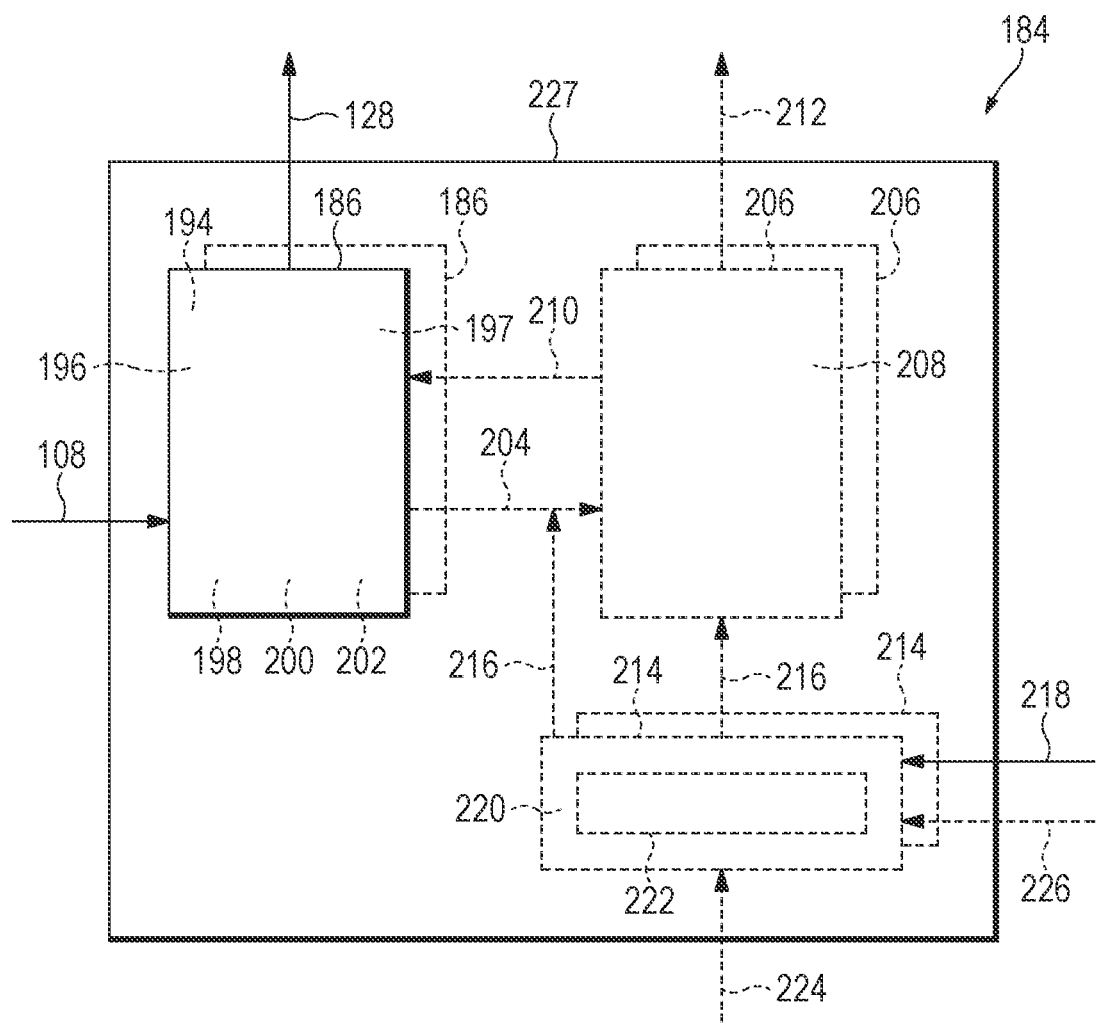
FIG. 3 is a schematic view of an example of a gas removal assembly of the hydrogen generation assembly of FIG. 2.

An example of a gas removal assembly 126 is shown in FIG. 3, which is generally indicated at 184. Unless specifically excluded, gas removal assembly 184 may include one or more components of other gas removal assemblies described in this disclosure. Gas removal assembly 184 may include at least one gas separation assembly 186.

Gas separation assembly 186 may include any suitable structure configured to separate carbon dioxide gas from byproduct stream 108 to produce a fuel stream 128 having a reduced concentration of carbon dioxide gas and/or an increased concentration of other gases compared to byproduct stream 108. For example, gas separation assembly 186 may include at least one absorber 194 configured to receive at least one chemical agent or absorbent 196 that is adapted to absorb, via reversible chemical binding and/or physical dissolution, at least a portion of carbon dioxide gas from byproduct stream 108.

The absorber is configured to receive absorbent 196 and direct flow of byproduct stream 108 through the absorbent to absorb carbon dioxide gas from that streams. As used herein, "absorb" means that carbon dioxide gas is bound to or fixed by the absorbent through a reversible or irreversible process, including weak chemical binding and/or physical solvation, and the bound carbon dioxide gas may involve surface interactions with the absorbent, bulk interactions with the absorbent, or both. Absorbent 196 may be in liquid form, in solid form, or a combination. Suitable examples of absorbents for carbon dioxide include any chemical or mix of chemicals that bind carbon dioxide, such as metal hydroxides (e.g., sodium hydroxide, potassium hydroxide, calcium hydroxide, magnesium hydroxide, etc.); metal oxides (e.g., sodium oxide, potassium oxide, calcium oxide, magnesium oxide, iron oxide, etc.); organic amines, especially alkanolamines (e.g., monoethanolamine and diethanolamine, both liquids under normal conditions of temperature and pressure); UCARSOL® formulated solvents for acid-gas removal (manufactured and sold by Dow Chemical Company); aqueous solutions of metal hydroxides; Ascarite® (Thomas Scientific); CarboLime™ (Allied Health Products Inc.); SodaLime (Airgas Corp.); immobilized organic amines (such as organic amines bound to polymeric substrates, especially polymeric beads); dimethyl polyethyleneglycol, propylene carbonate, polyethylene glycol dialkyl ethers (e.g., Genosorb® 1753 sold by Clariant); organic ionic liquids; mixtures of the above chemicals and/or chemical agents; and other agents or mixtures of agents that reversibly absorb carbon dioxide by weak chemical interactions and/or physical dissolution.

Fuel stream 128 leaving absorber 194 may include a reduced concentration of carbon dioxide gas and/or an increased concentration of other gases compared to byproduct stream 108. Preferably, the fuel stream includes less than 25% carbon dioxide and especially preferred is less than 10% carbon dioxide. Absorber 194 may be operated at a pressure of greater than 50 psig, and preferably at a pressure that is between 100 psig and 500 psig.

When absorbent 196 is in solid form, absorber 194 may include two or more absorbent beds 197 and may be configured to direct flow of byproduct stream 108 to a first bed of those absorbent beds. When that bed is nearly saturated with carbon dioxide, the absorber may be configured to direct flow to another bed of the absorbent beds to allow the absorbent of the previous absorbent bed to be recharged and/or regenerated. When absorbent 196 is in liquid form, the absorbent may be configured to absorb or bind carbon dioxide gas at relatively low temperatures and then release or desorb the gas(es) at elevated temperatures. This process is known as temperature-swing absorption or TSA. Alternatively, a carbon dioxide absorbent may be selected that binds carbon dioxide at high pressure and releases carbon dioxide at low pressure (which also is known as pressure-swing absorption).

Gas separation assembly 186 may alternatively, or additionally, include a membrane contactor assembly 198 that may include one or more permeable membranes 200 (such as one or more carbon dioxide-selective membranes). The membrane contactor assembly 198 may be configured to separate carbon dioxide gas from byproduct stream 108. For example, permeable membranes 200 may have relatively high permeability to carbon dioxide gas relative to other gases allowing carbon dioxide gas from byproduct stream 108 to pass from a feed side to a permeate side of the permeable membranes.

Membrane contactor assembly 198 may additionally be configured to receive at least one liquid chemical agent or liquid absorbent 202 that is adapted to absorb at least a portion of carbon dioxide gas from the carbon dioxide gas separated from byproduct stream 108 (such as the carbon dioxide gas that passes from the feed side to the permeate side of the permeable membranes). For example, the membrane contactor assembly may receive the absorbent on the permeate side of permeable membranes 200. Liquid absorbent 202 may be configured to absorb or bind carbon dioxide gas at relatively low temperatures and then release or desorb the gas(es) at elevated temperatures. Examples of suitable liquid absorbents include alkanolamines, such as monoethanolamine or diethanolamine, or water solutions thereof. However, other organic amines, solutions of organic amines, or solutions of inorganic hydroxide salts and/or organic hydroxide salts may be used.

When gas separation assembly 186 includes absorber(s) 194 and/or permeable membrane(s) 200 that receive a liquid absorbent, the gas separation assembly may produce at least one liquid absorbent stream 204 having absorbed carbon dioxide gas (which also may be referred to as "spent liquid absorbent stream(s)" or "gas laden liquid absorbent stream(s)." When spent liquid absorbent stream 204 is produced and the absorption of gas(es) in that stream is reversible, gas removal assembly 184 may additionally include at least one gas extraction assembly 206.

Gas extraction assembly 206 may include any suitable structure configured to extract (or desorb) the absorbed gases from liquid absorbent stream(s) 204. For example, gas extraction assembly 206 may include one or more strippers 208. In some embodiments, when the liquid absorbent includes absorbed carbon dioxide gas, the gas extraction assembly may be configured to extract or desorb at least a substantial portion of the absorbed carbon dioxide gas to form an at least substantially regenerated liquid absorbent stream (or stripped liquid absorbent stream) 210 with at least a substantial portion of the carbon dioxide gas extracted, and an offgas stream 212 with the extracted carbon dioxide gas.

Stripped liquid absorbent stream 210 may be pumped or otherwise transported to gas separation assembly 186 to further absorb carbon dioxide gas from byproduct stream 108. Alternatively, or additionally, stripped liquid absorbent stream 210 may be stored for later use. Offgas stream 212 may be pumped or otherwise transported to one or more other components of the refining assembly, such as to supplement one or more heating fuel streams. Alternatively, offgas stream 212 may be stored, exhausted into the air, or otherwise disposed.

Gas extraction assembly 206 may use any suitable mechanism to regenerate liquid absorbent stream 204 having the absorbed gases. When the liquid absorbent used in gas separation assembly 186 is configured to absorb or bind carbon dioxide gas at relatively low temperatures and then release or desorb the gas(es) at elevated temperatures, gas removal assembly 184 may further include at least one heating assembly 214. The heating assembly may be configured to produce at least one heated exhaust stream (or combustion stream) 216 from at least one heating fuel stream 218, typically as combusted in the presence of air. Heated exhaust stream 216 is schematically illustrated in FIG. 3 as heating gas extraction assembly 206. The heated exhaust stream may alternatively, or additionally, heat spent liquid absorbent stream 204 prior to gas extraction assembly 206, as shown in FIG. 3.

Heating assembly 214 may include any suitable structure configured to generate the heated exhaust stream(s), such as a burner or combustion catalyst in which a fuel is combusted with air to produce the heated exhaust stream(s). The heating assembly may include an ignitor or ignition source 220 that is configured to initiate the combustion of fuel. Heating assembly 214 may achieve and/or maintain in gas extraction assembly 206 and/or piping prior to that assembly any suitable temperatures. For example, heating assembly 214 may heat the gas extraction assembly to at least a target operating temperature and/or at least a minimum extraction or desorption temperature for the particular liquid absorbent used.

In some embodiments, heating assembly 214 may include a burner assembly 222 and may be configured to receive at least one fuel stream 218 and to combust the fuel stream in the presence of air to provide a hot combustion stream 216 that may be used to heat the gas removal reactor. Air may be delivered to the heating assembly via a variety of mechanisms. For example, an air stream 224 may be delivered to the heating assembly as a separate stream, as shown in FIG. 3. Alternatively, or additionally, air stream 224 may be delivered to the heating assembly with at least one of the fuel streams 218 for heating assembly 214 and/or drawn from the environment within which the heating assembly is utilized.

Fuel stream 218 may include any combustible liquid(s) and/or gas(es) that are suitable for being consumed by heating assembly 214 to provide the desired heat output. Some fuel streams may be gases when delivered and combusted by heating assembly 214, while others may be delivered to the heating assembly as a liquid stream. Examples of suitable heating fuels for fuel streams 218 include carbon-containing feedstocks, low molecular weight condensable fuels, and low molecular weight hydrocarbons. Other examples include carbon dioxide gas from one or more byproduct streams 226. For example, one or more byproduct streams 226 from other components and/or assemblies of the fuel processing system may be used as a suitable heating fuel for fuel stream 218. In some examples, at least a portion of fuel stream 128 is used for byproduct stream(s) 226.

Combustion stream 216 may additionally, or alternatively, be used to heat other portions of the fuel processing system and/or other systems with which the heating assembly is used. Additionally, other configuration and types of heating assemblies 214 may be used. For example, heating assembly 214 may be an electrically powered heating assembly that is configured to heat gas extraction assembly 206 and/or piping upstream of that assembly by generating heat using at least one heating element (such as a resistive heating element), waste heat stream(s), solar heating, electric heating, etc. In those embodiments, heating assembly 214 may not receive and combust a combustible fuel stream to heat vaporizer to a suitable vaporization temperature and/or heat methane-producing reactor to a suitable methane-producing temperature.

The heating assembly also may be configured to heat other components and/or assemblies, such as a feedstock delivery system, the feedstock supply streams, methane-producing assemblies, and/or other assemblies of the purification assembly, or any suitable combination of those systems, streams, and regions. The heating assembly may additionally be configured to heat other components of the refining assembly. For example, the heated exhaust stream may be configured to heat a pressure vessel and/or other canister containing the heating fuel and/or the hydrogen-production fluid that forms at least portions of the feed and/or fuel streams for the fuel processing system.

Heating assembly 214 may be housed in an assembly shell or housing 227 with the gas separation and gas extraction assemblies. The heating assembly may be separately positioned relative to one or both of those assemblies but in thermal and/or fluid communication with one or both to provide the desired heating. Heating assembly 214 may be located partially or completely within the common shell, and/or at least a portion (or all) of the heating assembly may be located external that shell. When the heating assembly is located external the shell, the hot combustion gases from burner assembly 222 may be delivered via suitable heat transfer conduits to one or more components within the shell.

Although gas removal assembly 184 (in FIG. 3), and hydrogen-producing region 78 and/or vaporization region 76 (in FIG. 2) are shown to each include a heating assembly, gas removal assembly 184, vaporization region 76, and hydrogen-producing region may have a common heating assembly that may be located within shell 120, within the shell of one or more of the gas removal assemblies, or outside those shells. When there is a common heating assembly, the heating assembly may include suitable heat transfer conduits to transfer heat to the components of the gas removal assembly, the vaporization region, and/or the hydrogen-producing region. Additionally, when gas extraction assembly 206 includes two or more strippers 208, the gas extraction assembly may include a common heating assembly 214 for two or more of the strippers (and, in some embodiments, for all of the strippers). Moreover, although gas removal assembly 184 is shown to include a single gas separation assembly 186, a single gas extraction assembly 206, and a single heating assembly 214, the gas removal assembly may include two or more gas separation assemblies, two or more gas extraction assemblies, and/or two or more heating assemblies, as shown in dashed lines in FIG. 3.

Figure 4:
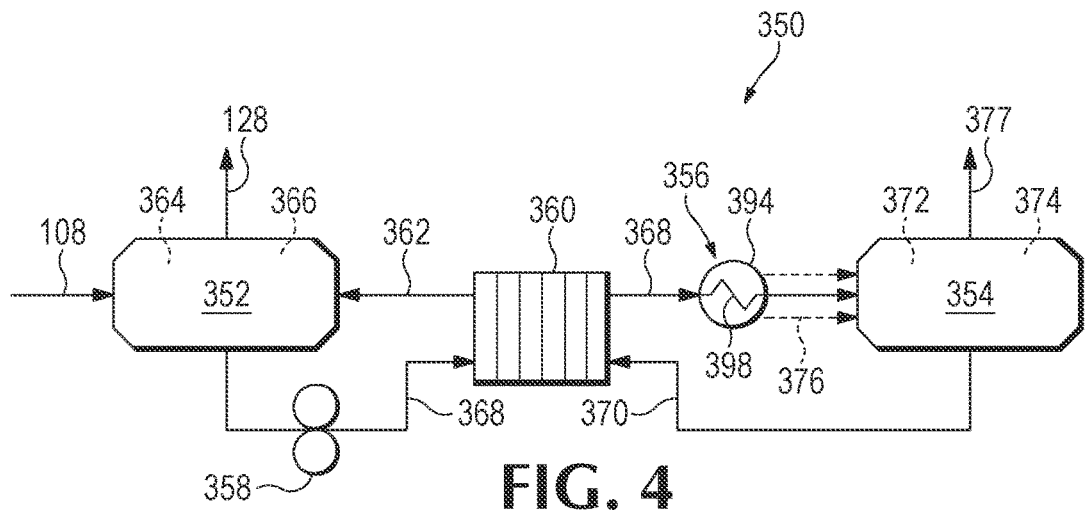
FIG. 4 is a schematic view of an example of the gas removal assembly of FIG. 3.

An example of gas removal assembly 184 is shown in FIG. 4, which is generally indicated at 350. Unless specifically excluded, gas removal assembly 350 may include one or more components of the other gas removal assemblies and/or other assemblies in this disclosure. Gas removal assembly 350 may include at least one absorber 352, at least one stripper 354, at least one heating assembly 356, at least one pump 358, and at least one heat exchanger 360.

Absorber 352 may include any suitable structure configured to receive a liquid absorbent stream 362 that is adapted to absorb at least a portion of carbon dioxide gas from byproduct stream 108 and/or to direct flow of that stream through the liquid absorbent stream. For example, absorber 352 may include at least one spray nozzle 364 configured to at least partially atomize the liquid absorbent stream into one or more sprayed liquid absorbent streams 366. The absorber may be configured to direct flow of byproduct stream 108 through sprayed liquid absorbent stream(s) 366 in any suitable flow configuration, such as counter-current flow, cross-current flow, or parallel flow. As byproduct stream 108 flows through the sprayed liquid absorbent stream(s), carbon dioxide gas may, at least partially, be absorbed by the sprayed stream(s) to form fuel stream 128 without the absorbed carbon dioxide gas and a spent liquid absorbent stream 368 having the absorbed carbon dioxide gas. Absorber 352 may be operated at a pressure greater than 50 psig, and preferably at a pressure between 100 psig and 500 psig.

An alternative suitable configuration is to return liquid absorbent stream 362 into the absorber without using a spray nozzle. For example, liquid absorbent stream 362 may enter a top, middle, or bottom portion of absorber 352 through a suitable tube or pipe connection, and the liquid absorbent may be allowed to accumulate to fill a volume at the bottom of the absorber. Byproduct stream 108 may be directed to bubble up through the volume of the liquid absorbent to remove at least a portion of carbon dioxide gas to form fuel stream 128.

Stripper 354 may include any suitable structure configured to receive one or more spent liquid absorbent streams 368, strip the absorbed carbon dioxide gas from those stream(s), and/or deliver one or more stripped liquid absorbent streams 370 to absorber(s) 352. For example, stripper 354 may include at least one spray nozzle 372 configured to at least partially atomize the spent liquid absorbent stream into one or more sprayed spent liquid absorbent streams 374. Stripper 354 may strip the absorbed carbon dioxide gas via any suitable mechanism(s). For example, when the liquid absorbent(s) used for liquid absorbent stream 362 absorbs or binds carbon dioxide gas within a first temperature range and releases or desorbs carbon dioxide gas within a second temperature range higher than the first temperature range, then stripper 354 may be configured to receive one or more heated exhaust streams 376 from heating assembly 356 and direct the flow of those streams through the sprayed spent liquid absorbent stream(s).

For example, the sprayed spent liquid stream(s) may be heated by the heated exhaust stream(s) between 60° C. and 200° C., and preferably between 80° C. and 150° C., to drive off the absorbed carbon dioxide gas to produce or yield at least substantially regenerated liquid absorbent stream 370. The released of desorbed gasses may form at least one offgas stream 377. Stripper 354 may be operated within the range of 0 psig and 50 psig, and preferably 0 psig and 10 psig.

Heating assembly 356 may include any suitable structure configured to produce at least one heated exhaust stream 376 for heating sprayed spent liquid absorbent stream(s) 374.

For example, the heating assembly may heat the stripper to any suitable temperature(s), such as at least a minimum release or desorption temperature for the carbon dioxide gas in the sprayed spent liquid absorbent stream(s).

The heating assembly 356 may include at least one heater 394 that is powered by at least one power assembly (not shown). Heater 394 may include at least one heating element 398 (such as a resistive heating element). The heating element may heat spent liquid absorbent stream 368 prior to stripper 354 (and/or spray nozzle 372) and/or may heat the spent liquid absorbent stream in the stripper. The power assembly may include one or more electric cords (to allow a user to plug the heater into an electrical outlet), solar panels, wind turbines, fuel cells, etc.

Figure 5:
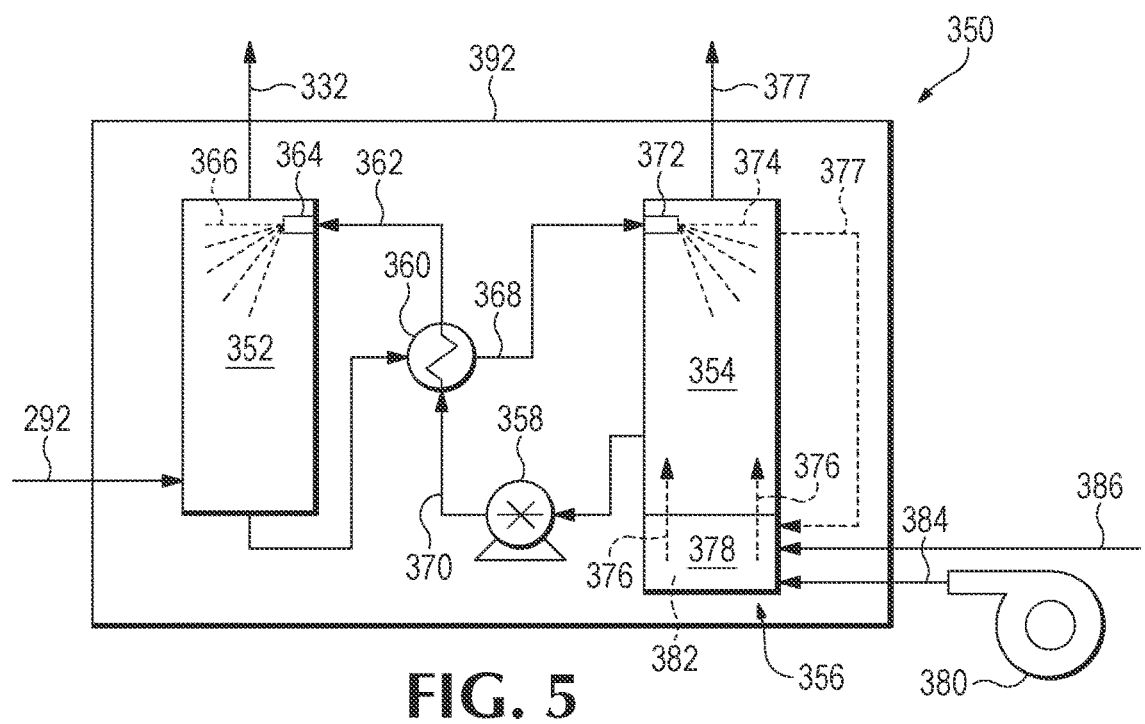
FIG. 5 is a schematic view of another example of the gas removal assembly of FIG. 3.

Additionally, other configuration and types of heating assemblies 356 may be used. For example, heating assembly 356 may include a burner assembly 378, at least one air blower 380, and an igniter assembly 382, as shown in FIG. 5. The burner assembly may include any suitable structure configured to receive at least one air stream 384 and at least one fuel stream 386 and to combust the at least one fuel stream to produce heated exhaust stream(s) 376. The fuel stream may be provided by feedstock delivery system 74, absorber 352, and/or one or more other gas removal assemblies. Additionally, at least a portion of offgas stream 377 may be used as that byproduct fuel stream. Fuel stream(s) 386 may be delivered to burner assembly 378 via a pump and/or another suitable device. Air blower 380 may include any suitable structure configured to generate air stream(s) 384. Igniter assembly 382 may include any suitable structure configured to ignite fuel stream(s) 386.

Pump 358 may be configured to deliver or transport spent liquid absorbent stream 368 to stripper 354 for desorption of at least a portion of the absorbed carbon dioxide gas from the liquid absorbent stream, as shown in FIG. 4. Alternatively, pump 358 may be configured to deliver or transport stripped liquid absorbent stream(s) 370 to absorber 352 for absorption of at least a portion of the carbon dioxide gas from byproduct stream 108, as shown in FIG. 5. In some embodiments, the spent and/or stripped liquid absorbent streams flow between the absorber and stripper without requiring the use of pumps and/or other electrically powered fluid-delivery mechanisms. Heat exchanger 360 may include any suitable structure configured to transfer heat from the stripped liquid absorbent stream(s) to the spent liquid absorbent stream(s).

In some embodiments, gas removal assembly 350 may include a shell or housing 392 that may at least partially contain one or more other components of that assembly. For example, shell 392 may at least partially contain absorber 352, stripper 354, heating assembly 356, pump 358, and/or heat exchanger 360, as shown in FIG. 5. The shell or housing may include insulation and/or a jacket. Alternatively, the gas removal assembly may be contained within a common shell or housing of the other components of the fuel processing assembly.

Figure 6:
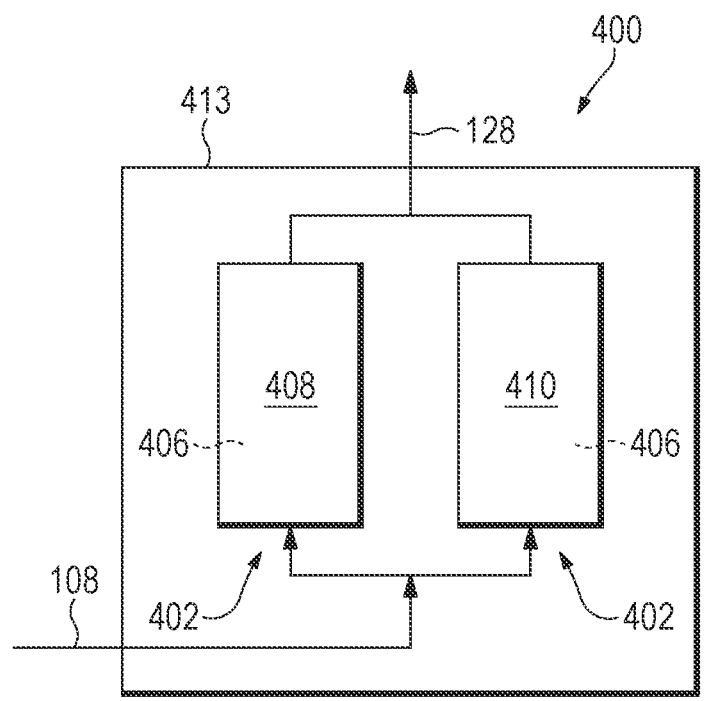
FIG. 6 is a schematic view of an additional example of the gas removal assembly of FIG. 3.

Another example of gas removal assembly 184 is shown in FIG. 6, which is generally indicated at 400. Unless specifically excluded, gas removal assembly 400 may include one or more components of the other gas removal assemblies in this disclosure. For example, gas removal assembly 400 may include one or more absorbers 402.

Absorbers 402 may include at least one solid absorbent 406 (such as in solid absorbent beds) adapted to absorb at least a portion of carbon dioxide gas from byproduct stream 108, and/or to direct flow of that stream through the solid absorbent. As byproduct stream 108 flows through the solid absorbent, carbon dioxide gas may, at least partially, be absorbed forming fuel stream 128 without the absorbed carbon dioxide gas. Gas removal assembly 400 may include any suitable number of absorbers 402. For example, the gas removal assembly may include a first absorber 408 and a second absorber 410, as shown in FIG. 6. Although second gas removal assembly 400 is shown to include two absorbers 402, the assembly may include any suitable number of absorbers, such as one absorber or three or more absorbers.

When gas removal assembly 400 includes two or more absorbers 402, the gas removal assembly may include two or more control valves (not shown) and/or other structure to isolate one or more absorbers 402 and/or direct flow to one or more other absorbers 402. For example, byproduct stream 108 may be directed to flow through first absorber 408 until the solid absorbent in that absorber is saturated or substantially saturated with carbon dioxide gas. At that point, the control valves may isolate first absorber 408 and direct flow of byproduct stream 108 through second absorber 410 until the solid absorbent in the second absorber is saturated or substantially saturated. The solid absorbent in the isolated first absorber may be recharged or regenerated while byproduct stream 108 is flowing through the second absorber, or vice-versa. In some embodiments, gas removal assembly 400 may include a shell or housing 413 which may at least partially contain one or more other components of that assembly. For example, shell 413 may at least partially contain absorbers 402, as shown in FIG. 6. The shell or housing may include insulation and/or a jacket. Alternatively, the gas removal assembly may be contained within a common shell or housing of the other components of the fuel processing assembly.

Figure 7:
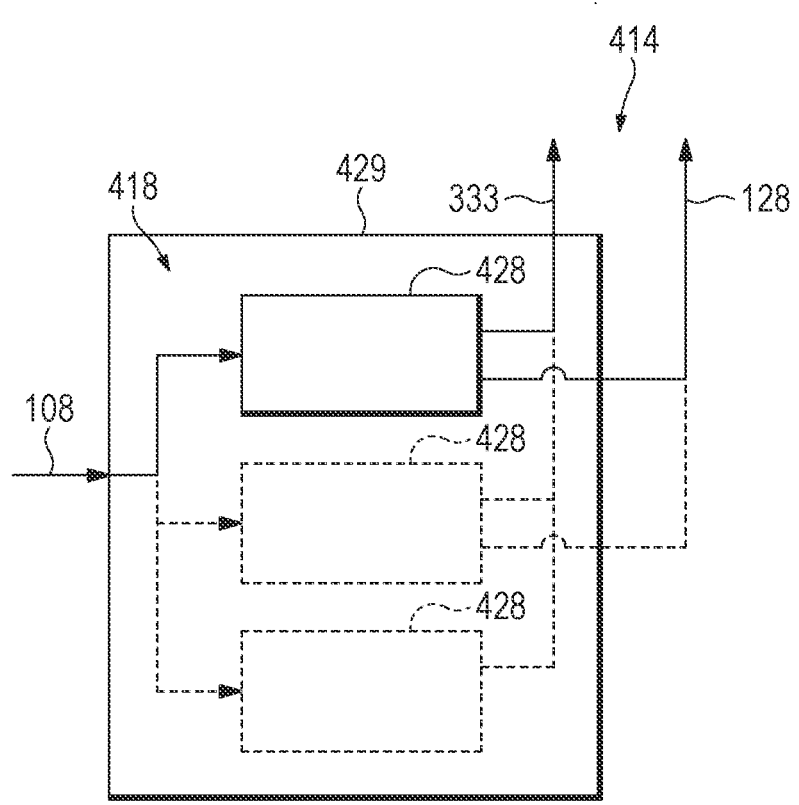
FIG. 7 is a schematic view of a further example of the gas removal assembly of FIG. 3.

Another example of gas removal assembly 184 is shown in FIG. 7, which is generally indicated at 414. Unless specifically excluded, gas removal assembly 414 may include one or more components of the other gas removal assemblies and/or other assemblies in this disclosure. Gas removal assembly 414 may include a membrane assembly 418.

Membrane assembly 418 may include any suitable structure configured to separate at least a portion of carbon dioxide gas from byproduct stream 108 to form fuel stream 128. The separated carbon dioxide gas may form an offgas stream 333. For example, membrane assembly 418 may include one or more carbon dioxide selective membranes 428 that are configured to separate at least a portion of carbon dioxide gas from byproduct stream 108. Membrane assembly 418 may include any suitable number of membranes 428, as shown in dashed lines in FIG. 7. When membrane assembly 418 includes two or more membranes 428, those membranes may be arranged in parallel or in series. In some embodiments, gas removal assembly 414 may include a shell or housing 429 which may at least partially contain one or more other components of that assembly. For example, shell 429 may at least partially contain membrane assembly 418, as shown in FIG. 7. The shell or housing may include insulation and/or a jacket. Alternatively, the gas removal assembly may be contained within a common shell or housing of the other components of the fuel processing assembly.

Figure 8:
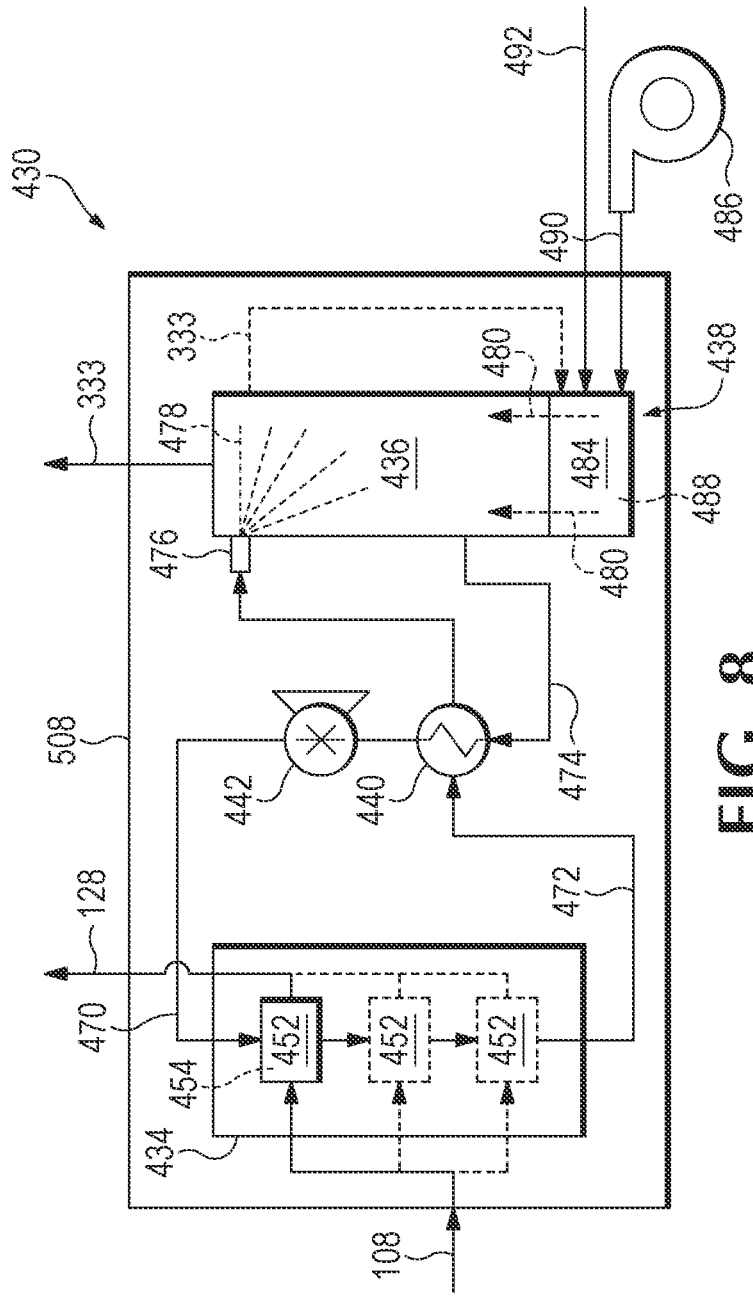
FIG. 8 is a schematic view of another example of the gas removal assembly of FIG. 3.

Another example of gas removal assembly 184 is shown in FIG. 8, which is generally indicated at 430. Unless specifically excluded, gas removal assembly 430 may include one or more components of the other gas removal assemblies and/or other assemblies in this disclosure. Gas removal assembly 430 may include a membrane contactor assembly 434, at least one stripper 436, at least one heating assembly 438, at least one heat exchanger 440, and at least one pump 442.

Membrane contactor assembly 434 may include any suitable structure configured to separate carbon dioxide gas from byproduct stream 108 to form fuel stream 128. For example, membrane contactor assembly 434 may include one or more membrane contactors 452. Membrane contactor may include a plurality of carbon dioxide selective membranes 454 that are configured to separate at least a portion of carbon dioxide gas from byproduct stream 108.

Figure 9:
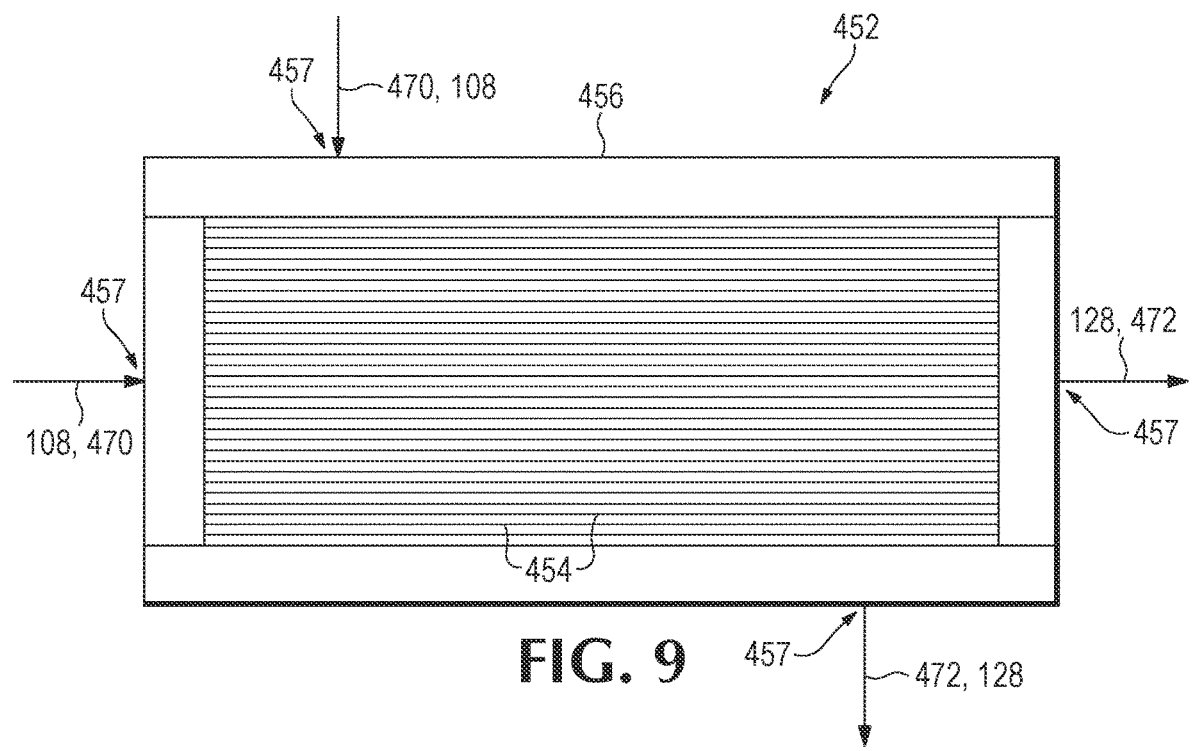
FIG. 9 is a schematic view of an example of a membrane contactor of the gas removal assembly of FIG. 8.

Membranes 454 may be hollow fiber or small-diameter tubular membranes, which may be sealed (or potted) into a shell 456, as shown in FIG. 9. Shell 456 may include inlet and outlet ports 457 and any suitable number of membranes 454, such as hundreds to thousands of those membranes. Membranes 454 may have any suitable lengths, such as from about one centimeter to about two to three meters, and/or any suitable diameters, such as from 0.1 millimeters to 5 millimeters. The membranes may be configured to be microporous and/or highly permeable to carbon dioxide gas.

Membranes 454 may be composed of material(s) that are chemically inert to the components of byproduct stream 108 whether those components are in gas phase and/or liquid phase. Additionally, when membranes 454 are microporous, the membranes may be composed of one or more materials that are not wet by the liquid phase of the components of byproduct stream 108 and/or liquid absorbent stream 470. In other words, the liquid phase of those components is not drawn into the micropore structure by capillary forces. Otherwise, if the micropore structure of the membranes is filled with the liquid phase, then relatively slow diffusion of carbon dioxide gas out of the liquid-filled pores may adversely affect overall performance of the membranes. An example of a suitable microporous polypropylene membrane is made by Celgard®, LLC (Charlotte, N.C.).

Figure 10:
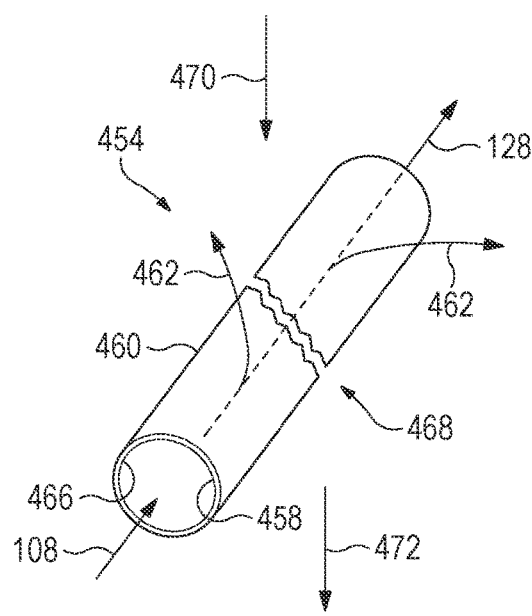
FIG. 10 is a schematic view of an example of a membrane of the membrane contactor of FIG. 9.

Membrane contactor(s) 452 may direct flow of byproduct stream 108 through a bore or lumen 458 of membranes 454, as shown in FIG. 10. At least a portion of carbon dioxide gas may pass through one or more walls 460 into the membrane contactor shell, as indicated at 462 in FIG. 10. When byproduct stream 108 are directed to flow into and/or through lumen 458 of membranes 454, the interior of the lumens may be referred to as "feed side 466" and the interior of the shell (and/or exterior of the membranes) may be referred to as "permeate side 468."

Figure 11:
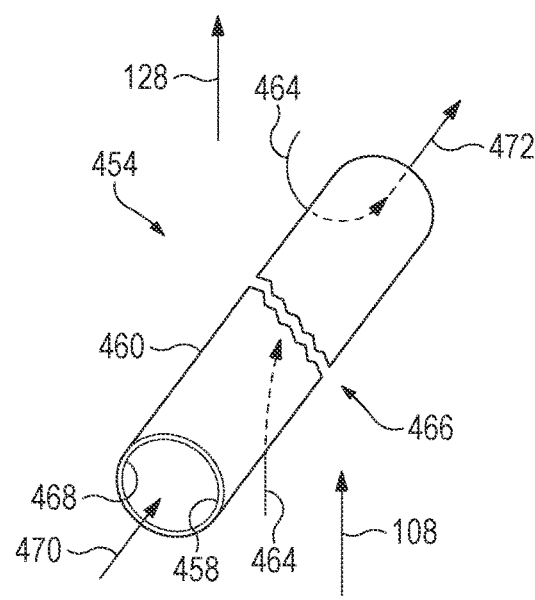
FIG. 11 is a schematic view of another example of a membrane of the membrane contactor of FIG. 9.

Alternatively, the membrane contactor(s) may direct flow of byproduct stream 108 through the membrane contactor shell and/or over the membranes, as shown in FIG. 11. At least a portion of carbon dioxide gas may pass through wall(s) 460 into lumen 458 of membranes 454, as indicated at 464 in FIG. 11. When byproduct stream 108 are directed to flow into and/or through the membrane contactor shell and/or over the membranes, the interior of the membrane contactor shell or exterior of the membranes may be referred to as "feed side 466" and the interior of the lumens may be referred to as "permeate side 468." Preferably, byproduct stream 108 is directed to flow through the lumens of the membranes when the lumen diameter is small and the length of the membrane is long to prevent high pressure drops that would be encountered if liquid absorbent stream 470 is directed to flow through the lumens.

Additionally, membrane contactor(s) 452 may receive at least one liquid absorbent stream 470 at the permeate side of the membranes. The liquid absorbent stream may be adapted to absorb at least a portion of carbon dioxide gas that passes from the feed side to the permeate side of membranes 454 to form liquid absorbent stream(s) 472 having absorbed carbon dioxide gas (which also may be referred to as "spent liquid absorbent stream(s) 472"). For example, when membrane contactor(s) 452 are configured to receive byproduct stream 108 through lumens 458 of membranes 454, the membrane contactors may receive liquid absorbent stream 470 in membrane contactor shell 456. Alternatively, when membrane contactor(s) 452 are configured to receive byproduct stream(s) 108 through membrane contactor shell 456, the membrane contactors may receive the liquid absorbent stream through lumens 458 of membranes 454. The liquid absorbent(s) in liquid absorbent stream(s) 470 may be configured to absorb (or bind) at least a portion of carbon dioxide gas at relatively low temperatures and then release (or desorb) those gas(es) at elevated temperatures. Alternatively, the liquid absorbent(s) in liquid absorbent stream(s) 470 are driven by a pressure cycle in which case absorption of carbon dioxide in 434 may be at relatively high pressure of 50 to 100 psig or especially at 100 to 500 psig, and desorption in 436 occurs at lower pressure.

Membrane contactor assembly 434 may include any suitable number of membrane contactors 452, as shown in dashed lines in FIG. 8. When membrane contactor assembly 434 includes two or more membrane contactors 452, those membrane contactors may be arranged in parallel or in series.

Stripper 436 may include any suitable structure configured to receive one or more spent liquid absorbent streams 472, strip the absorbed carbon dioxide gas from those stream(s), and/or deliver one or more stripped liquid absorbent streams 474 to membrane contactor(s) 452. For example, stripper 436 may include at least one spray nozzle 476 configured to at least partially atomize the spent liquid absorbent stream into one or more sprayed spent liquid absorbent streams 478. Stripper 436 may strip the absorbed carbon dioxide gas via any suitable mechanism(s). For example, when the liquid absorbent(s) used for liquid absorbent stream 470 absorbs or binds carbon dioxide gas within a first temperature range and releases or desorbs carbon dioxide gas within a second temperature range higher than the first temperature range, then stripper 436 may be configured to receive one or more heated exhaust streams 480 from heating assembly 438 and direct the flow of those streams through the sprayed spent liquid absorbent stream(s).

The sprayed spent liquid stream(s) may be heated by the heated exhaust stream(s) between 60° C. and 200° C., and preferably between 80° C. and 150° C., to drive off the absorbed carbon dioxide gas to produce or yield at least substantially regenerated liquid absorbent stream 474. The released or desorbed gasses may form at least one offgas stream 333. Stripper 436 may be operated within the range of 0 psig and 50 psig, and most preferably in the range of 0 psig and 10 psig.

Heating assembly 438 may include any suitable structure configured to produce at least one heated exhaust stream 480 for heating sprayed spent liquid absorbent stream(s) 478. For example, the heating assembly may heat the stripper to any suitable temperature(s), such as at least a minimum release or desorption temperature for the carbon dioxide gas in the sprayed spent liquid absorbent stream(s).

The heating assembly may include a burner assembly 484, at least one air blower 486, and an igniter assembly 488, as shown in FIG. 8. The burner assembly may include any suitable structure configured to receive at least one air stream 490 and at least one fuel stream 492 and to combust the at least one fuel stream to produce heated exhaust stream(s) 480. Fuel stream(s) 492 may be provided by feedstock delivery system 232, the membrane contactor assembly (such as from at least a portion of fuel stream 128), and/or one or more of the gas removal assemblies. In some embodiments, at least a portion of offgas stream 333 may supplement fuel stream(s) 492. Fuel stream(s) 492 may be delivered to burner assembly 378 via pump(s) and/or other suitable device(s). Air blower 486 may include any suitable structure configured to generate air stream(s) 492. Igniter assembly 488 may include any suitable structure configured to ignite fuel stream(s) 492.

Figure 12:
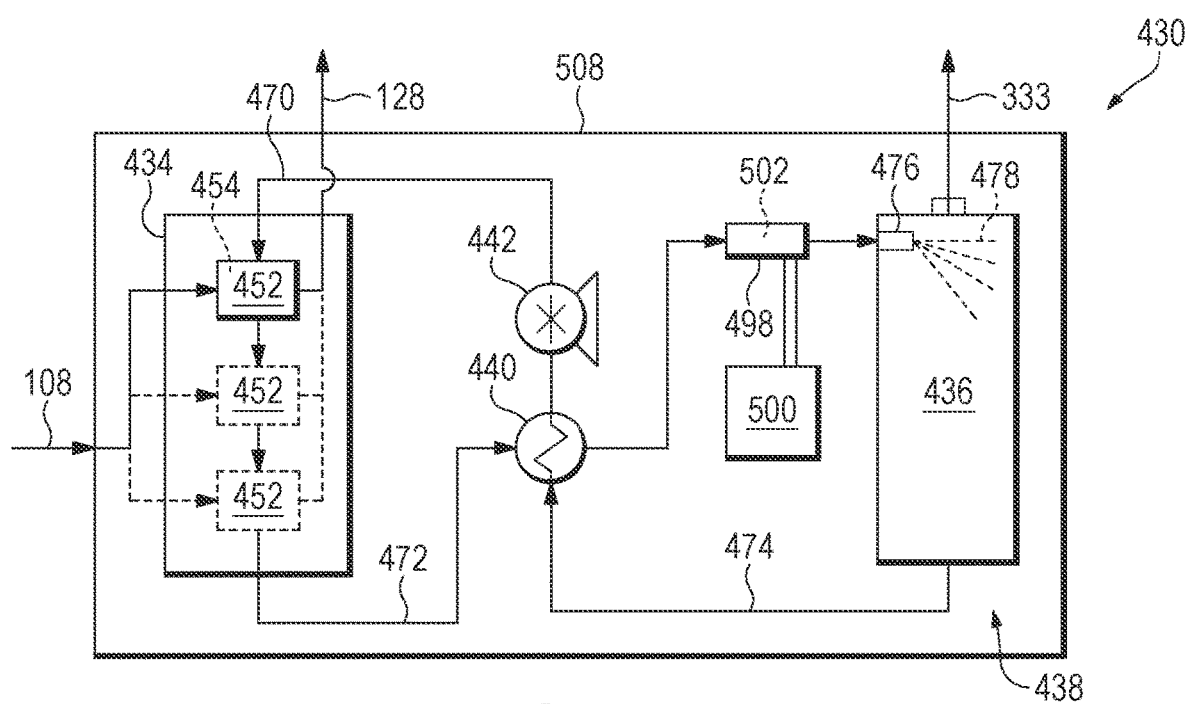
FIG. 12 is a schematic view of an additional example of the gas removal assembly of FIG. 3.

Additionally, other configuration and types of heating assemblies 438 may be used. For example, heating assembly 438 may include at least one heater 498 that is powered by at least one power assembly 500, as shown in FIG. 12. Heater 498 may include at least one heating element 502 (such as a resistive heating element). The heating element may heat spent liquid absorbent stream 472 prior to stripper 436 (and/or spray nozzle 476) and/or may heat the spent liquid absorbent stream in the stripper. Power assembly 500 may include one or more electric cords (to allow a user to plug the heater into an electrical outlet), solar panels, wind turbines, fuel cells, etc.

Heat exchanger 440 may include any suitable structure configured to transfer heat from the stripped liquid absorbent stream(s) to the spent liquid absorbent stream(s). Pump 442 may include suitable structure configured to deliver or transport stripped liquid absorbent stream(s) 474 to membrane contactor(s) 452 for additional absorption of carbon dioxide gas from byproduct stream 108. In some embodiments, the spent and/or stripped liquid absorbent streams flow between the absorber and stripper without requiring the use of pumps and/or other electrically powered fluid-delivery mechanisms.

In some embodiments, gas removal assembly 430 may include a shell or housing 508 which may at least partially contain one or more other components of that assembly. For example, shell 508 may at least partially contain membrane contactor assembly 434, stripper 436, heating assembly 438, heat exchanger 440, and/or pump 442, as shown in FIGS. 8 and 12. In some embodiments, shell 508 may include insulation and/or a jacket. Alternatively, the gas removal assembly may be contained within a common shell or housing of the other components of the fuel processing assembly.

Gas removal assembly 184 may additionally, or alternatively, include one or more structures and/or components, such as described in U.S. Pat. No. 9,605,224, which is hereby incorporated by reference for all purposes. Although the gas removal assemblies of the present disclosure are discussed to separate and/or remove carbon dioxide, those gas removal assemblies may additionally separate and/or remove carbon monoxide and/or other gases. Although the hydrogen generation assemblies and gas removal assemblies of the present disclosure include streams that are delivered via pump, one or more of those streams may be delivered without a pump, or vice-versa.

Figure 13:
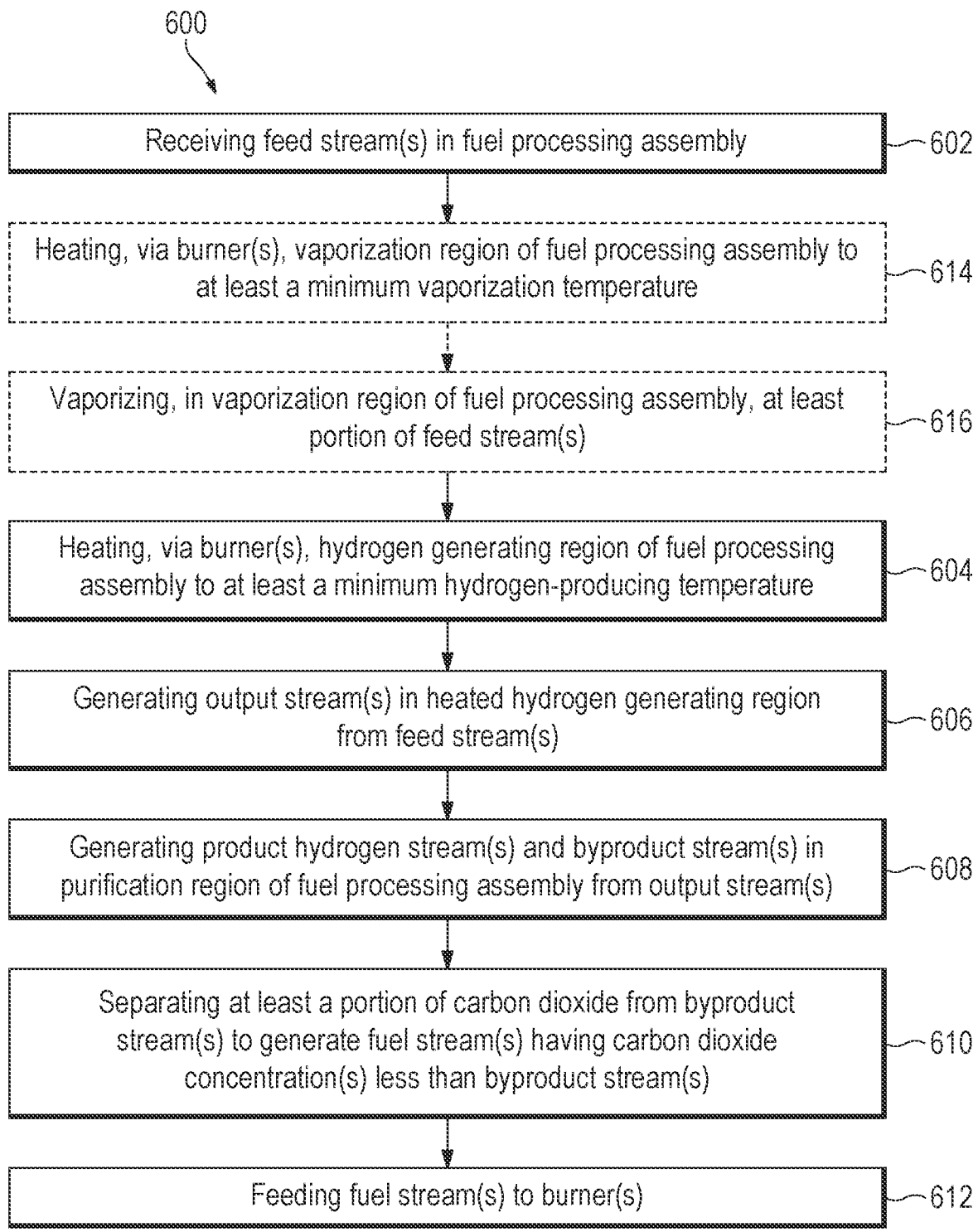
FIG. 13 is a flowchart of an example of a method of generating hydrogen.

An example of a method 600 of generating hydrogen is shown in FIG. 13. Although particular steps are shown in FIG. 13, other examples of method 600 may omit, replace, modify, duplicate, and/or add one or more steps. Additionally, the steps may be performed in any suitable sequence.

At 602, one or more feed streams containing a carbon-containing feedstock and/or water may be received in a fuel processing assembly. At 604, a hydrogen generating region of the fuel processing assembly may be heated, such as via one or more burners, to at least a minimum hydrogen-producing temperature.

At 606, one or more output streams may be generated in the heated hydrogen generating region from the feed stream(s). The output stream may contain hydrogen gas, carbon dioxide, and one or more other gases. At 608, product hydrogen stream(s) and byproduct stream(s) may be generated from the output stream(s) in a purification region of the fuel processing assembly. The product hydrogen stream(s) may have a hydrogen concentration greater than the output stream and a carbon dioxide concentration less than the output stream. Additionally, byproduct stream(s) may have a hydrogen concentration less than the output stream and a carbon dioxide concentration greater than the output stream. In some examples, the purification region may include one or more hydrogen-selective membranes in which the product hydrogen stream is generated from the portion of the output stream that passes through the hydrogen-selective membrane(s), and the byproduct stream is generated from the portion of the output stream that does not pass through the hydrogen-selective membrane(s).

At 610, at least a portion of the carbon dioxide gas may be separated or removed from the byproduct stream(s) to generate fuel stream(s). The fuel stream(s) may have a carbon dioxide concentration less than the byproduct stream(s). For example, at least a portion of the carbon dioxide may be absorbed by or via at least one absorbent, such as at least one solid absorbent or at least one liquid absorbent stream, from the byproduct stream(s). In some examples, the spent liquid absorbent stream(s) or liquid absorbent stream(s) having absorbed carbon dioxide gas may be heated to strip at least a substantial portion of the absorbed carbon dioxide gas to form a stripped liquid absorbent stream and an offgas stream containing the stripped carbon dioxide gas.

In other examples, byproduct stream(s) flow through one or more carbon dioxide selective membranes to remove carbon dioxide gas. At least a portion of the carbon dioxide gas passes from the feed side to the permeate side of the membranes to form the fuel stream(s), while the portion of the byproduct stream that does not pass through the membrane (i.e., does not pass from the feed side to the permeate side) forms the offgas stream. In some examples, liquid absorbent stream(s) flow through the permeate side of carbon dioxide selective membrane(s) to produce spent liquid absorbent streams or liquid absorbent stream(s) having absorbed carbon dioxide gas. In some examples, the spent liquid absorbent stream(s) or liquid absorbent stream(s) having absorbed carbon dioxide gas may be heated to strip at least a substantial portion of the absorbed carbon dioxide gas to form a stripped liquid absorbent stream and an offgas stream containing the stripped carbon dioxide gas. At 612, the fuel stream(s) may be fed to the burner(s) for burning.

Some examples of method 600 may additionally, or alternatively, include one or more other steps. For example, at 614, a vaporization region of the fuel processing assembly may be heated, such as via one or more burners, to at least a minimum vaporization temperature. The burners used to heat the vaporization region may be the same or different from the one or more burners used to heat the hydrogen generating region. Additionally, at 616, at least a portion of the feed stream(s) may be vaporized in the vaporization region of the fuel processing assembly to form one or more at least substantially vaporized streams. When at least a portion of the feed stream(s) is vaporized, the output stream generated at 606 may be at least partially generated from the at least substantially vaporized stream(s).

The hydrogen generation assemblies and methods of the present disclosure provide an effective way to reduce carbon dioxide emissions produced when generating hydrogen from a carbon-containing feedstock, such as from generating hydrogen from methanol. The carbon dioxide may alternatively be removed from the combustion exhaust stream. However, the combustion exhaust stream has relatively low carbon dioxide concentrations, such as because of dilution of combustion gases with excess air supplied for combustion, and at very low pressure.

In one example, 1.575 L/min methanol/water mix (62.5 wt % methanol/balance water) yields 1,396 std. L/min product hydrogen at 83% lower heating value (LHV) energy efficiency. The byproduct stream from the purification region is about 1.5 MPa to about 2.0 MPa and about 1.0 Nm3/min. Additionally, the byproduct stream is composed of about 25.7% hydrogen, 15.8% water, 1.8% methanol, 47.8% carbon dioxide, and 10% carbon monoxide. The byproduct stream is about 400° C. and exits the heat exchanger at about 30° C. The feed stream enters the same heat exchanger about 25° C. and exits about 195° C. The heat exchanger has a heat duty of about 578 kJ/min. In contrast, the combustion exhaust stream is about 110 kPa and about 3.2 Nm3/min with carbon dioxide concentration of 19% to 22%.

INDUSTRIAL APPLICABILITY

The present disclosure, including hydrogen generation devices and components of those devices, is applicable to the fuel-processing and other industries in which hydrogen gas is purified, produced, and/or utilized.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A method of generating hydrogen, comprising:
   receiving a feed stream in a fuel processing assembly, the feed stream containing a carbon-containing feedstock;
   heating, via one or more burners, a hydrogen generating region of the fuel processing assembly to at least a minimum steam reforming temperature for the feed stream;
   generating, via steam reforming, an output stream in the heated hydrogen generating region of the fuel processing assembly from the received feed stream, the output stream containing hydrogen gas and carbon dioxide gas;
   generating a product hydrogen stream and a byproduct stream in a purification region of the fuel processing assembly from the output stream, the product hydrogen stream having a hydrogen concentration greater than the output stream and a carbon dioxide concentration less than the output stream, and the byproduct stream having a hydrogen concentration less than the output stream and a carbon dioxide concentration greater than the output stream;
   separating at least a portion of the carbon dioxide gas from the byproduct stream to generate a fuel stream having a carbon dioxide concentration less than the byproduct stream, wherein separating at least a portion of the carbon dioxide gas from the byproduct stream includes allowing the at least a portion of the carbon dioxide gas to pass from a feed side to a permeate side of at least one carbon dioxide selective membrane, and additionally includes flowing a liquid absorbent stream through the permeate side of the at least one carbon dioxide selective membrane to produce therefrom a liquid absorbent stream having absorbed carbon dioxide gas; and
   feeding the fuel stream to the one or more burners.

2. The method of claim 1, further comprising vaporizing, in a vaporization region of the fuel processing assembly, at least a portion of the feed stream to form a vaporized stream, and wherein generating an output stream in the heated hydrogen generating region includes generating the output stream in the heated hydrogen generation region from the vaporized stream.

3. The method of claim 2, further comprising heating, via the one or more burners, the vaporization region of the fuel processing assembly to vaporize the at least a portion of the feed stream.

4. The method of claim 1, wherein separating at least a portion of the carbon dioxide gas from the byproduct stream further includes heating the liquid absorbent stream having absorbed carbon dioxide gas to strip at least a substantial portion of the absorbed carbon dioxide gas to form a stripped liquid absorbent stream and an offgas stream containing the stripped carbon dioxide gas.

5. The method of claim 1, where the purification region includes at least one hydrogen-selective membrane, wherein generating a product hydrogen stream and a byproduct stream in a purification region includes generating, via the at least one hydrogen-selective membrane the product hydrogen stream and the byproduct stream, and wherein the product hydrogen stream is generated from the portion of the output stream that passes through the at least one hydrogen-selective membrane, and the byproduct stream is generated from the portion of the output stream that does not pass through the at least one hydrogen-selective membrane.

6. A method of generating hydrogen, comprising:
   receiving a feed stream in a fuel processing assembly, the feed stream containing a carbon-containing feedstock;
   heating, via one or more burners, a hydrogen generating region of the fuel processing assembly to at least a minimum hydrogen-producing temperature for the received feed stream;
   generating an output stream in the heated hydrogen generating region of the fuel processing assembly from the received feed stream, the output stream containing hydrogen gas as a majority component and carbon dioxide gas;

generating a product hydrogen stream and a byproduct stream in a purification region of the fuel processing assembly from the output stream, the product hydrogen stream having a hydrogen concentration greater than the output stream and a carbon dioxide concentration less than the output stream, and the byproduct stream having a hydrogen concentration less than the output stream and a carbon dioxide concentration greater than the output stream;

separating at least a portion of the carbon dioxide gas from the byproduct stream to generate a fuel stream having a carbon dioxide concentration less than the byproduct stream, wherein separating at least a portion of the carbon dioxide gas from the byproduct stream includes allowing the at least a portion of the carbon dioxide gas to pass from a feed side to a permeate side of at least one carbon dioxide selective membrane and additionally includes flowing a liquid absorbent stream through the permeate side of the at least one carbon dioxide selective membrane to produce therefrom a liquid absorbent stream having absorbed carbon dioxide gas; and feeding the fuel stream to the one or more burners.

7. The method of claim 6, further comprising vaporizing, in a vaporization region of the fuel processing assembly, at least a portion of the feed stream to form a vaporized stream, and wherein generating an output stream in the heated hydrogen generating region includes generating the output stream in the heated hydrogen generation region from the vaporized stream.

8. The method of claim 7, further comprising heating, via the one or more burners, the vaporization region of the fuel processing assembly to vaporize the at least a portion of the feed stream.

9. The method of claim 6, wherein separating at least a portion of the carbon dioxide gas from the byproduct stream further includes heating the liquid absorbent stream having absorbed carbon dioxide gas to strip at least a substantial portion of the absorbed carbon dioxide gas to form a stripped liquid absorbent stream and an offgas stream containing the stripped carbon dioxide gas.

10. The method of claim 6, where the purification region includes at least one hydrogen-selective membrane, wherein generating a product hydrogen stream and a byproduct stream in a purification region includes generating, via the at least one hydrogen-selective membrane the product hydrogen stream and the byproduct stream, and wherein the product hydrogen stream is generated from the portion of the output stream that passes through the at least one hydrogen-selective membrane, and the byproduct stream is generated from the portion of the output stream that does not pass through the at least one hydrogen-selective membrane.

11. The method of claim 6, wherein the minimum hydrogen-producing temperature is a minimum steam reforming temperature for the received feed stream.

\* \* \* \* \*